US011983687B2

(12) United States Patent
Oe

(10) Patent No.: US 11,983,687 B2
(45) Date of Patent: May 14, 2024

(54) TERMINAL MANAGEMENT SYSTEM, TERMINAL MANAGEMENT DEVICE, AND CONTROL METHOD THEREOF

(71) Applicant: Toshiba Tec Kabushiki Kaisha, Tokyo (JP)

(72) Inventor: Ryosuke Oe, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 304 days.

(21) Appl. No.: 17/575,510

(22) Filed: Jan. 13, 2022

(65) Prior Publication Data
US 2022/0374854 A1 Nov. 24, 2022

(30) Foreign Application Priority Data
May 21, 2021 (JP) .................. 2021-086176

(51) Int. Cl.
*G06Q 20/20* (2012.01)
*G06F 11/07* (2006.01)
*G06Q 20/32* (2012.01)

(52) U.S. Cl.
CPC ....... *G06Q 20/202* (2013.01); *G06F 11/0772* (2013.01); *G06F 11/079* (2013.01); *G06Q 20/326* (2020.05)

(58) Field of Classification Search
CPC ............... G06Q 20/202; G06Q 20/326; G06F 11/0772; G06F 11/0792
See application file for complete search history.

(56) References Cited

U.S. PATENT DOCUMENTS

| | | | | |
|---|---|---|---|---|
| 8,856,032 B2* | 10/2014 | Carlegren | ........... | G06Q 20/208 |
| | | | | 705/16 |
| 9,892,438 B1* | 2/2018 | Kundu | ............... | G06Q 30/0609 |
| 10,977,635 B2* | 4/2021 | Storiale | ............... | G06Q 20/202 |
| 11,182,803 B2* | 11/2021 | Budano | ............. | G06K 7/10415 |
| 2011/0071914 A1* | 3/2011 | Beasley | ............... | G06Q 20/105 |
| | | | | 705/41 |
| 2011/0145093 A1* | 6/2011 | Paradise | ................ | G06Q 30/02 |
| | | | | 705/26.1 |
| 2013/0314033 A1* | 11/2013 | Maruyama | .......... | H01M 10/445 |
| | | | | 320/107 |
| 2021/0350446 A1* | 11/2021 | D'Haenens | ........ | G06Q 30/0639 |

FOREIGN PATENT DOCUMENTS

JP      2013-186875 A      9/2013

* cited by examiner

*Primary Examiner* — Scott A Zare
(74) *Attorney, Agent, or Firm* — FOLEY & LARDNER LLP

(57) ABSTRACT

A terminal management device includes an acquisition unit, a detection unit, and a restriction unit. The acquisition unit acquires status information indicating the operating condition of the mobile terminal operated by a customer used for purchase processing of a commodity. The detection unit detects an error condition of the mobile terminal based on the status information acquired by the acquisition unit. The restriction unit restricts the purchase processing by the mobile terminal according to the number of error conditions of the mobile terminal detected by the detection unit.

15 Claims, 28 Drawing Sheets

FIG. 5

| APP ID | 001 |
|---|---|
| CURRENT DATE AND TIME DT | STATUS ST |
|  |  |
|  |  |
|  |  |
|  |  |
| ⋮ | ⋮ |

| APP ID | | 001 |
|---|---|---|
| ERROR RAISED DATE | ERROR CONTENT | INVALIDITY FLAG |
|  |  |  |
|  |  |  |
|  |  |  |
|  |  |  |
| ⋮ | ⋮ | ⋮ |

FIG. 8

| APP ID | COMMUNICATION CONNECTION STATE |
|---|---|
| | |
| | |
| | |
| ⋮ | ⋮ |

321

TERMINAL MANAGEMENT SYSTEM, TERMINAL MANAGEMENT DEVICE, AND CONTROL METHOD THEREOF

CROSS-REFERENCE TO RELATED APPLICATION

This application is based upon and claims the benefit of priority from Japanese Patent Application No. 2021-086176, filed on May 21, 2021, the entire contents of which are incorporated herein by reference.

FIELD

Embodiments described herein relate generally to a terminal management system, a terminal management device, and a control method thereof.

BACKGROUND

In recent years, various store systems are devised in which customers use mobile terminals (smartphones, cart terminals, and the like) to self-register and check out (pay) purchased commodities if the customers buy at a store's sales floor. In such a store system, a customer who uses a mobile terminal (i.e., a user), operates the mobile terminal and the user themselves registers and checks out (pays) for purchased commodities. Therefore, there is a possibility that the user ends the use of the mobile terminal during the registration of the purchased commodity and takes out the purchased commodity for which checkout (payment) is not completed from the store. For a user who operates a mobile terminal in which such an error condition is raised, there is a demand for a mechanism that can restrict the use of purchasing services (hereinafter, in the present specification, may be simply referred to as "purchase processing by mobile terminal" or "transaction by mobile terminal"), including the registration operation and checkout processing operation for purchased commodities, on the mobile terminal.

DESCRIPTION OF THE DRAWINGS

FIG. 5 is a schematic diagram illustrating an example of a time-series buffer;

FIG. 6 is a schematic diagram illustrating a data structure of an error condition data record saved in an error condition file;

FIG. 8 is a schematic diagram illustrating an example of a connection management table;

DETAILED DESCRIPTION

There are provided a terminal management system and a terminal management device capable of restricting the use of purchasing services including the registration operation and checkout processing operation of purchased commodities by a mobile terminal in which an error condition is raised, and a control method thereof.

In general, according to at least one embodiment, the terminal management device includes an acquisition unit, a detection unit, and a restriction unit, such as of at least one processor. The acquisition unit acquires status information indicating the operating condition of the mobile terminal operated by a customer used for purchase processing of a commodity. The detection unit detects an error condition of the mobile terminal based on the status information acquired by the acquisition unit. The restriction unit restricts the purchase processing by the mobile terminal according to the number of error conditions of the mobile terminal detected by the detection unit.

Hereinafter, at least one embodiment will be described with reference to drawings.

First Embodiment

Figure 1:
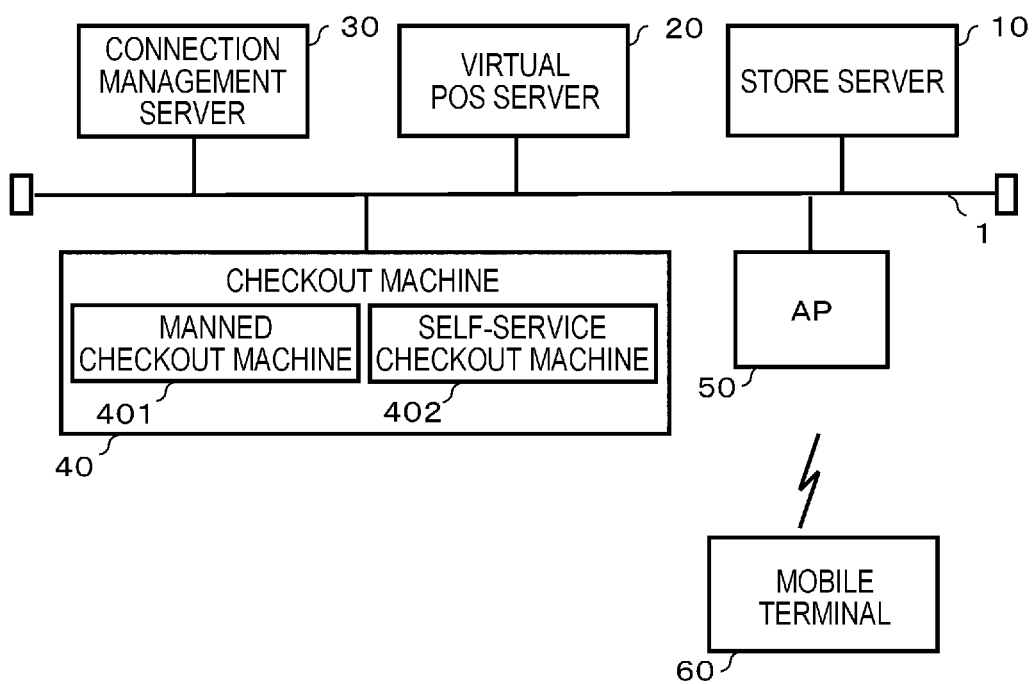
FIG. 1 is a block diagram illustrating a schematic configuration of a terminal management system according to a first embodiment.

FIG. 1 is a block diagram illustrating a schematic configuration of a terminal management system SYA according to a first embodiment.

The terminal management system SYA includes a store server 10, a virtual point of sales (POS) server 20, a connection management server 30, a checkout machine (register) 40, an access point (interface) 50, and a mobile terminal 60. The store server 10, the virtual POS server 20, the connection management server 30, the checkout machine 40, and the access point 50 are connected to a communication network 1 such as a local area network (LAN). The mobile terminal 60 includes a wireless unit 66 (see FIG. 2). The mobile terminal 60 wirelessly communicates with the access point 50. The access point 50 relays communication between each device connected to the communication network 1, that is, the store server 10, the virtual POS server 20, the connection management server 30, the checkout machine 40, and the mobile terminal 60. Although only one access point 50 is illustrated in FIG. 1, there may be two or more access points depending on the scale of the store and the like.

The store server 10 manages a commodity database. The commodity database stores commodity data records that record data on commodities sold in a store. The commodity data record includes items such as a commodity code, a commodity name, and a price. The commodity code is commodity identification information set for each commodity in order to individually identify the commodity. In general, a barcode representing a commodity code is attached to each commodity.

The virtual POS server 20 cooperates with the mobile terminal 60 to operate the mobile terminal 60 to realize the function of the POS terminal. The virtual POS server 20 is an example of a terminal management device.

The connection management server 30 manages the communication connection condition of the mobile terminal 60 that communicates with the terminal management system SYA. The connection management server 30 manages, for example, whether the mobile terminal 60 is connected to a wireless LAN or the like in the store. The wireless LAN conforms to, for example, the standard of Wi-Fi (registered trademark).

The checkout machine 40 is a device that enables a clerk or a user to check out for a commodity that the user intends to purchase, that is, a so-called purchased commodity. The number of the checkout machines 40 is not particularly limited. Examples of the checkout machine 40 include a manned checkout machine in which a clerk performs operations related to checkout for purchased commodities, the so-called manned checkout machine 401, and a self-service checkout machine in which users perform operations related to checkout for purchased commodities, the so-called self-service checkout machine 402. The number of the manned checkout machines 401 is not particularly limited. The number of self-service checkout machines 402 is not particularly limited.

The mobile terminal 60 is a device that enables a user who is a customer operating the mobile terminal 60, for example, to input data related to registration of purchased commodities by themselves. The mobile terminal 60 is a device used for purchase processing including the registration operation or checkout processing operation of purchased commodities related to one transaction. The mobile terminal 60 is a portable communication terminal. The mobile terminal 60 is, for example, a smartphone, a tablet terminal, or the like equipped with a digital camera owned by the user. At the store, for example, the mobile terminal 60 may be rented out to a user who is a shopper. The mobile terminal 60 may be installed in a shopping cart, for example. The mobile terminal 60 has at least hardware for reading a data code such as a barcode or a two-dimensional code (e.g., a QR code).

Figure 2:
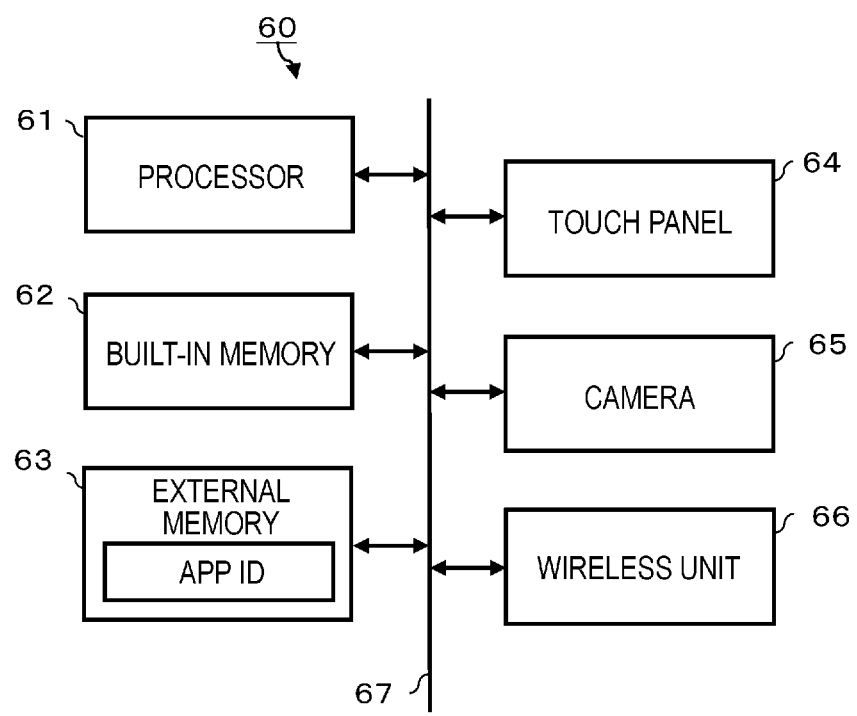
FIG. 2 is a block diagram illustrating a circuit configuration of a main part of a mobile terminal.

FIG. 2 is a block diagram illustrating a circuit configuration of a main part of the mobile terminal 60. As illustrated in FIG. 2, the mobile terminal 60 includes a processor 61, a built-in memory 62, an external memory 63, a touch panel 64, a camera 65, a wireless unit 66, and a system transmission line 67. The system transmission line 67 includes an address bus, a data bus, a control signal line, and the like. The mobile terminal 60 connects the processor 61, the built-in memory 62, the external memory 63, the touch panel 64, the camera 65, and the wireless unit 66 to the system transmission line 67. The processor 61, the internal memory 62, and the external memory 63 are connected by the system transmission line 67 to constitute a computer that performs information processing for controlling the mobile terminal 60.

The processor 61 corresponds to the central part of the computer. The processor 61 controls each part in order to realize various functions as the mobile terminal 60 according to an operating system or an application program. The processor 61 is, for example, a central processing unit (CPU).

The built-in memory 62 corresponds to a main storage part of the computer. The built-in memory 62 includes a non-volatile memory area and a volatile memory area. The built-in memory 62 stores the operating system or the application program in a nonvolatile memory area. The built-in memory 62 stores data necessary for the processor 61 to execute processing for controlling each unit in a volatile memory area. The built-in memory 62 uses a volatile memory area as a work area in which data is appropriately rewritten by the processor 61. The non-volatile memory area is, for example, a read only memory (ROM). The volatile memory area is, for example, a random access memory (RAM).

The external memory 63 corresponds to an auxiliary storage part of the computer. For example, the external memory 63 can be an SD memory card, a universal serial bus (USB) memory, or the like. The external memory 63 stores data used if the processor 61 performs various types of processing, data generated by the processing in the processor 61, and the like. The external memory 63 may store the application program described above.

The application program stored in the external memory 63 includes a shopping application program. Hereinafter, the shopping application program is abbreviated as a shopping app. The shopping app is an app that is executed when shopping at the store where the terminal management system SYA is installed. The method of installing the shopping app in the external memory 63 is not particularly limited. The control program can be recorded on a removable recording medium, or the control program can be distributed by communication via a network and installed in the external memory 63. The recording medium may be in any form such as a CD-ROM or a memory card as long as the medium can store a program and can be read by the device. The shopping app may be installed in the internal memory 62 instead of the external memory 63.

The touch panel 64 is a device that includes both an input device and a display device of the mobile terminal 60. The touch panel 64 detects the touch position with respect to the displayed image and outputs the touch position information to the processor 61.

The camera 65 is an imaging device built in the mobile terminal 60. The camera 65 operates as a still image or moving image shooting device or as a scanning device of data codes such as a barcode or a two-dimensional code by the shopping app installed on the mobile terminal 60.

The wireless unit 66 wirelessly communicates data with the access point 50 according to a wireless communication protocol.

The mobile terminal 60 stores the app ID in the external memory 63. The app ID is a unique code assigned to each shopping app to identify the shopping app installed on the mobile terminal 60.

Figure 3:
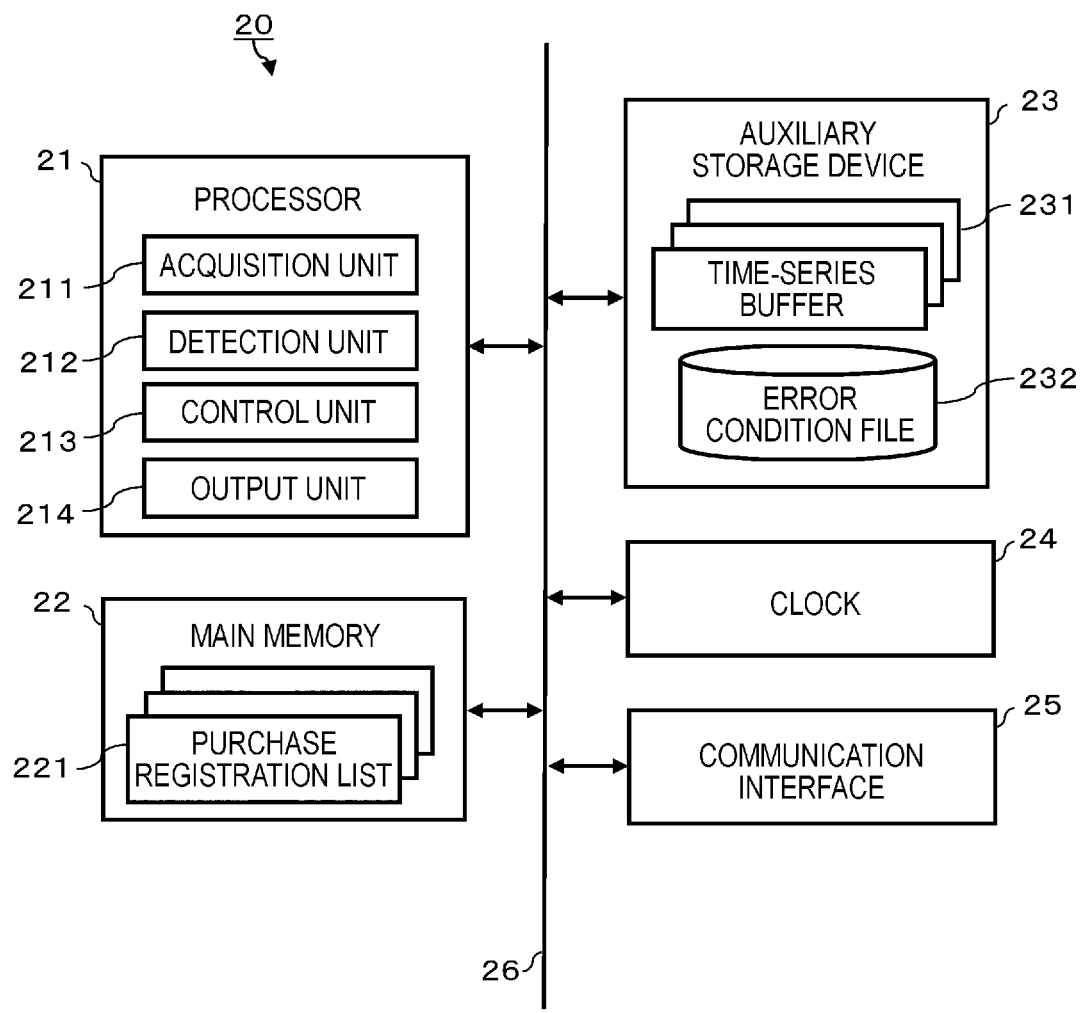
FIG. 3 is a block diagram illustrating a circuit configuration of a main part of a virtual POS server.

FIG. 3 is a block diagram illustrating a circuit configuration of a main part of the virtual POS server 20. The virtual POS server 20 includes a processor 21, a main memory 22, an auxiliary storage device 23, a clock 24, a communication interface 25, and a system transmission line 26. The system transmission line 26 includes an address bus, a data bus, a control signal line, and the like. The virtual POS server 20 connects the processor 21, the main memory 22, the auxiliary storage device 23, the clock 24, and the communication interface 25 to the system transmission line 26. In the virtual POS server 20, a computer is composed of the processor 21, the main memory 22, the auxiliary storage device 23, and the system transmission line 26 connecting therebetween.

The processor 21 corresponds to the central part of the computer. The processor 21 controls each unit to realize various functions as the virtual POS server 20 according to an operating system or an application program. The processor 21 is, for example, a CPU.

The main memory 22 corresponds to the main memory portion of the computer. The main memory 22 includes a non-volatile memory area and a volatile memory area. The main memory 22 stores the operating system or application program in the non-volatile memory area. The main memory 22 may store data necessary for the processor 21 to execute processing for controlling each unit in the non-volatile or volatile memory area. The main memory 22 uses a volatile memory area as a work area where data is appropriately rewritten by the processor 21. The non-volatile memory area is, for example, a ROM. The volatile memory area is, for example, RAM.

The auxiliary storage device 23 corresponds to the auxiliary storage portion of the computer. For example, electric erasable programmable read-only memory (EEPROM (registered trademark)), hard disc drive (HDD), solid state drive (SSD), or the like can be the auxiliary storage device 23. The auxiliary storage device 23 stores data used by the processor 21 to perform various kinds of processing, data generated by the processing of the processor 21, and the like. The auxiliary storage device 23 may store the above application program.

The clock 24 functions as a time information source for the virtual POS server 20. The processor 21 measures the current date and time based on the time information measured by the clock 24.

The communication interface 25 is connected to the communication network 1. The communication interface 25 communicates data with other devices connected via the communication network 1 according to a communication protocol.

Figure 4:
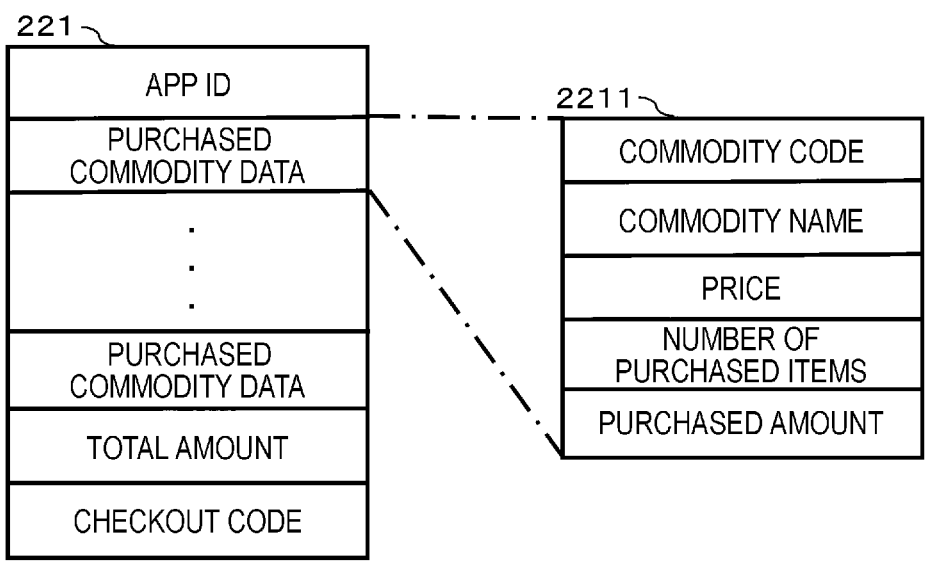
FIG. 4 is a schematic diagram illustrating an example of a purchase registration list.

The virtual POS server 20 having such a configuration uses a part of the volatile memory area of the main memory 22 as a purchase registration list 221 (see FIG. 4). The virtual POS server 20 can form a plurality of purchase registration lists 221 in the area. The storage destination of the purchase registration list 221 is not limited to the main memory 22. The purchase registration list 221 may be stored in the auxiliary storage device 23.

FIG. 4 is a schematic diagram illustrating an example of the purchase registration list 221. As illustrated in FIG. 4, the purchase registration list 221 has an area for describing the app ID, purchased commodity data 2211, total amount, and checkout code, respectively. The purchased commodity data 2211 includes commodity code, commodity name, price, number of purchased items (i.e., a quantity), purchased amount, and the like of the purchased commodity purchased by the user. The number of purchased items is the number of purchased commodities identified by the commodity code, and the purchased amount is the total price based on the number of purchased items. The total amount is the total purchase amount included in the purchased commodity data 2211. The checkout code will be described later. The purchase registration list 221 is generated in association with the app ID. The purchase registration list 221 is not limited to the item illustrated in FIG. 4.

The virtual POS server 20 uses a part of the storage area of the auxiliary storage device 23 as the area of a time-series buffer 231 (see FIG. 5) and an error condition file 232. In the area, time-series buffers 231 having the data structure illustrated in FIG. 5 are formed as many as the number of mobile terminals 60 that use the terminal management system SYA in the store. The storage destination of the time-series buffer 231 and the error condition file 232 is not limited to the auxiliary storage device 23. The time-series buffer 231 and the error condition file 232 may be stored in a part of the volatile memory area of the main memory 22.

FIG. 5 is a schematic diagram illustrating an example of the time-series buffer 231. As illustrated in FIG. 5, the time-series buffer 231 has an area for describing a status ST in the order of the earliest of the current date and time DT for each app ID. The status ST is information indicating the operating condition of the mobile terminal 60. The status ST includes "entered", "registered", "checkout in progress", "checkout completed", and "exited". "Entered" is, for example, a condition in which an entry operation for entering a store is performed. If the user reads the data code for entering the store prepared at the entrance of the store with the camera 65, the status ST is set to "entered", assuming that an operation of entering the store is performed. The data code for entering a store is a code of setting information specific to a store or a business entity that operates the store with a predetermined two-dimensional code system. "Registered" is, for example, a condition in which the user himself or herself is accepting the registration operation of a purchased commodity. If a first purchased commodity is registered, the status ST is set to "registered". From then on, the status ST remains "registered" until the transition to checkout is declared. "Checkout in progress" is, for example, a condition from the declaration of the transition to checkout to the completion of the checkout processing operation. "Checkout completed" is, for example, a condition in which the checkout processing operation of the purchased commodities is completed. "Exited" is, for example, a condition in which an operation of exiting the store is performed. If the user reads the data code for exiting the store prepared at the exit of the store with the camera 65, the status ST is set to "exited", assuming that an operation of exiting the store is performed. The data code for exiting a store is a code of setting information specific to a store or a business entity that operates the store with a predetermined two-dimensional code system. Normally, the status ST is described in the time-series buffer 231 in the order of "entered", "registered", "checkout in progress", "checkout completed", and "exited". The operation of setting the status ST to "entered", "registered", "checkout in progress", "checkout completed", or "exited" is not limited to the above-mentioned operation. The status ST is not limited to "entered", "registered", "checkout in progress", "checkout completed", and "exited".

FIG. 6 is a schematic diagram illustrating the data structure of an error condition data record 2321 stored in the error condition file 232. As illustrated in FIG. 6, the error condition data record 2321 stores the error condition data generated for each app ID. The error condition data record 2321 includes items such as error raised date, error content, and invalidity flag. The error raised date is the date on which an error condition is raised. The error condition is, for example, a condition in which a user is registering a purchased product at the store, but the checkout processing operation is not completed, a condition in which the mobile terminal 60, which is connected to the wireless LAN in the store during the registration operation of the purchased product, is no longer connected to the wireless LAN, and the like. The error content is the content of an error condition. The error content is, for example, "checkout incomplete", "disconnected with checkout incomplete", and the like. The invalidity flag is flag data for setting whether to invalidate the error condition that is raised on the error raised date. In the present embodiment, if the error raised date is outside a preset certain period, the invalidity flag on the same line as the error raised date is set to "1". The certain period is, for example, 3 months from Jan. 1, 2021, to Mar. 31, 2021, 6 months from Jan. 1, 2021, to Jun. 30, 2021, etc. The invalidity flag is "0" in the initial condition during the certain period, and is set to "1" outside the certain period. If the invalidity flag is set to "1", all items on the same line as the invalidity flag are invalidated. The error raised date, the error content, and the invalidity flag are hereinafter referred to as error condition data. The error condition data record 2321 is an example of information related to the error condition of the mobile terminal 60. The anomalous condition data record 2321 is not limited to the items in FIG. 6. How to set the certain period is freely selected. The value of the certain period may be fixed in the virtual POS server 20, or may be changed to a desired value by the store that manages the virtual POS server 20.

The processor 21 has functions as an acquisition unit (receiver or acquisition interface) 211, a detection unit (detector or detection circuitry) 212, a restriction unit (restriction processor or circuitry) 213, and an output unit (an output) 214. The acquisition unit 211 is a function for acquiring status information indicating the operating condition of the mobile terminal 60 operated by the customer used for the purchase processing of a commodity. The acquisition unit 211 can be called an acquisition means.

The detection unit 212 is a function of detecting an error condition of the mobile terminal 60 based on the status information acquired by the acquisition unit 211. The detection unit 212 can be called a detection means.

The restriction unit 213 is a function of restricting the purchase processing by the mobile terminal 60 according to the number of error conditions of the mobile terminal 60 detected by the detection unit 212. The restriction unit 213 can be called a restriction means.

The output unit 214 includes the following two functions. The first is a function of outputting a message to the mobile terminal 60 if the purchase processing by the mobile terminal 60 is restricted by the restriction unit 213. The second is a function of outputting a list of error conditions of the mobile terminal 60 detected by the detection unit 212 to the mobile terminal 60. The output unit 214 can be called an output means.

Figure 7:
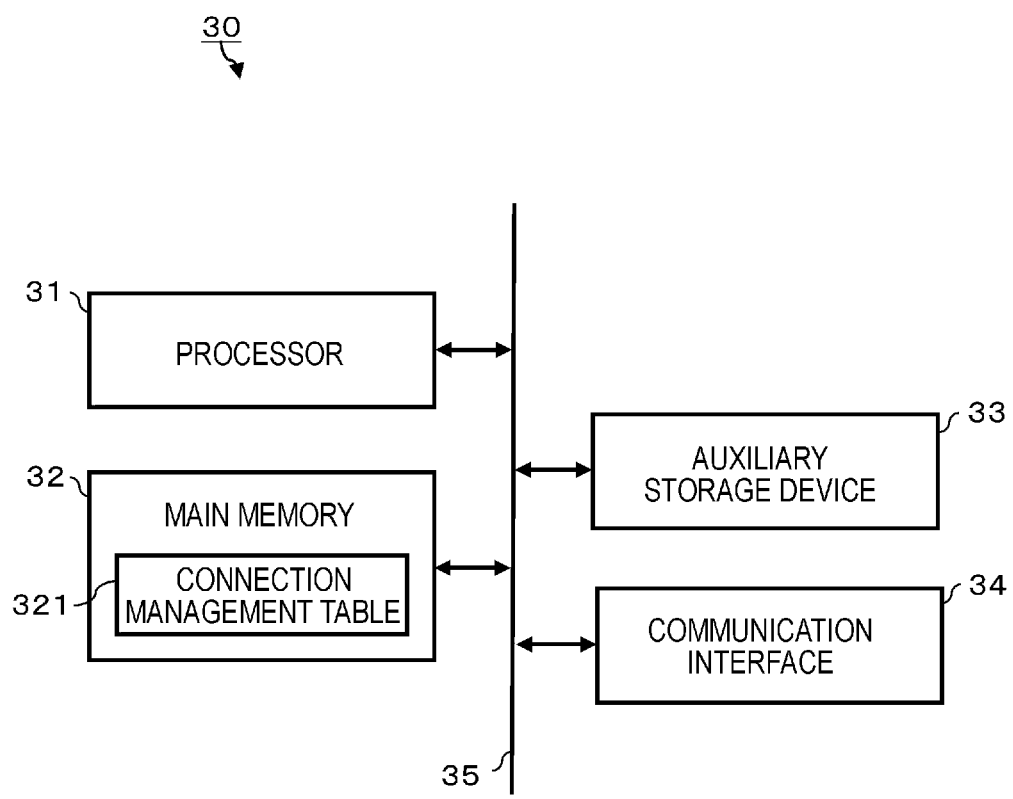
FIG. 7 is a block diagram illustrating a circuit configuration of a main part of a connection management server.

FIG. 7 is a block diagram illustrating a circuit configuration of a main part of the connection management server 30. The connection management server 30 includes a processor 31, a main memory 32, an auxiliary storage device 33, a communication interface 34, and a system transmission line 35. The system transmission line 35 includes an address bus, a data bus, a control signal line, and the like. The connection management server 30 connects the processor 31, the main memory 32, the auxiliary storage device 33, and the communication interface 34 to the system transmission line 35. In the connection management server 30, a computer is composed of the processor 31, the main memory 32, the auxiliary storage device 33, and the system transmission line 35 connecting therebetween.

The processor 31 corresponds to the central part of the computer. The processor 31 controls each part in order to realize various functions as the connection management server 30 according to an operating system or an application program. The processor 31 is, for example, a CPU.

The main memory 32 corresponds to the main memory portion of the computer. The main memory 32 includes a non-volatile memory area and a volatile memory area. The main memory 32 stores an operating system or an application program in the non-volatile memory area. The main memory 32 may store data necessary for the processor 31 to execute processing for controlling each unit in the non-volatile or volatile memory area. The main memory 32 uses the volatile memory area as a work area where data is appropriately rewritten by the processor 31. The non-volatile memory area is, for example, a ROM. The volatile memory area is, for example, RAM.

The auxiliary storage device 33 corresponds to the auxiliary storage portion of the computer. For example, EEPROM, HDD, SSD, and the like can be the auxiliary storage device 33. The auxiliary storage device 33 stores data used by the processor 31 to perform various kinds of processing, data generated by the processing of the processor 31, and the like. The auxiliary storage device 33 may store the above application program.

The communication interface 34 is connected to the communication network 1. The communication interface 34 communicates data with other devices connected via the communication network 1 according to a communication protocol.

The connection management server 30 having such a configuration uses a part of the volatile memory area of the main memory 32 as an area of the connection management table 321 (see FIG. 8). The connection management server 30 can form the connection management table 321 in this area. The storage destination of the connection management table 321 is not limited to the main memory 32. The connection management table 321 may be stored in the auxiliary storage device 33.

FIG. 8 is a schematic diagram illustrating an example of the connection management table 321. As illustrated in FIG. 8, the connection management table 321 describes the app ID and the communication connection condition of the mobile terminal 60 on which the shopping app identified by the app ID is installed. The communication connection condition includes "connected" and "disconnected". "Connected" is a condition that the mobile terminal 60 is connected to the wireless LAN in the store. Normally, the condition will be "connected" while the shopping app is running. "Disconnected" is a condition in which the mobile terminal 60, which is in a condition of being connected to the wireless LAN in the store, is no longer connected to the wireless LAN. The reasons why the mobile terminal 60 is no longer connected to the wireless LAN in the store are, for example, the battery of the mobile terminal 60 ran out, some problem occurred in the connection to the wireless LAN, the user intentionally disconnected from the wireless LAN, and the user ended the shopping app and exited the store. The communication connection condition is not limited to "connected" and "disconnected".

Figure 9:
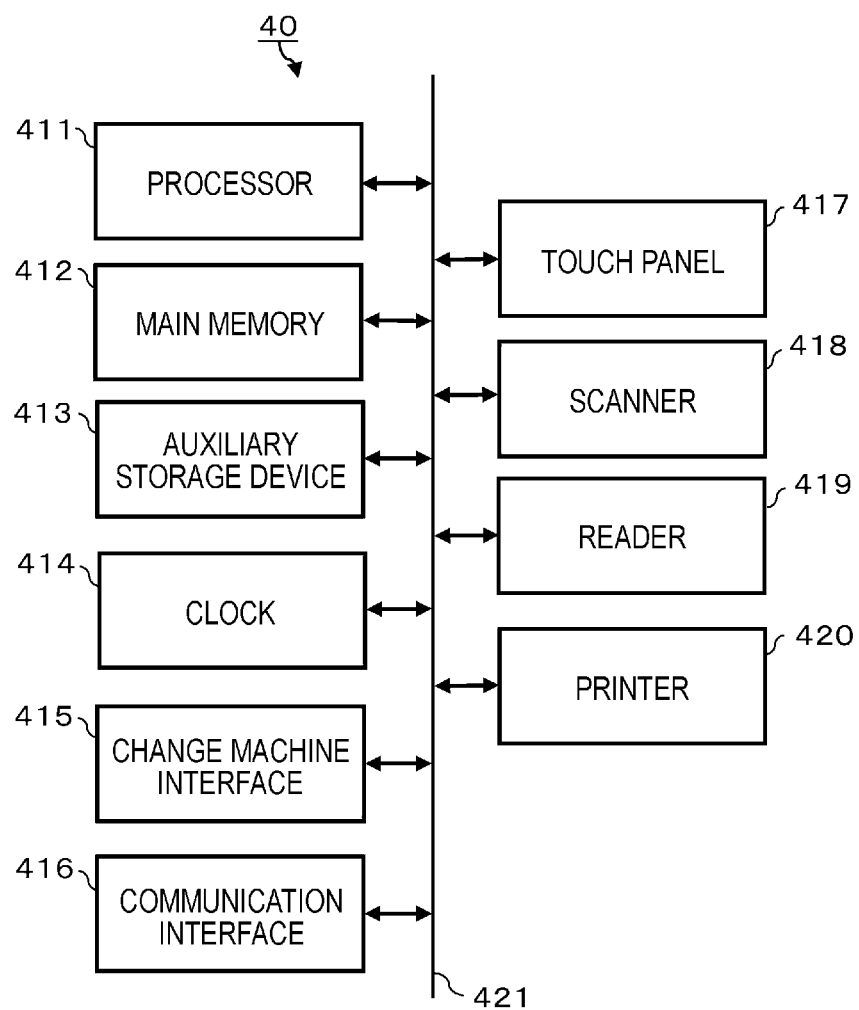
FIG. 9 is a block diagram illustrating a circuit configuration of a main part of a checkout machine.

FIG. 9 is a block diagram illustrating a circuit configuration of a main part of the checkout machine 40. The checkout machine 40 includes a processor 411, a main memory 412, an auxiliary storage device 413, a clock 414, a change machine interface 415, a communication interface 416, a touch panel 417, a scanner 418, a reader 419, a printer 420, and a system transmission line 421. The system transmission line 421 includes an address bus, a data bus, a control signal line, and the like. The system transmission line 421 connects the processor 411, the main memory 412, the auxiliary storage device 413, the clock 414, the change machine interface 415, the communication interface 416, the touch panel 417, the scanner 418, the reader 419, and the printer 420 to each other. The computer of the checkout machine 40 is configured by connecting the processor 411, the main memory 412, and the auxiliary storage device 413 by the system transmission line 421.

The processor 411 corresponds to the central part of the computer. The processor 411 controls each part in order to realize various functions as the checkout machine 40 according to an operating system or an application program. The processor 411 is, for example, a CPU.

The main memory 412 corresponds to the main memory portion of the computer. The main memory 412 includes a non-volatile memory area and a volatile memory area. The main memory 412 stores the operating system or application program in the non-volatile memory area. The main memory 412 may store data necessary for the processor 411 to execute processing for controlling each unit in the non-volatile or volatile memory area. The main memory 412 uses a volatile memory area as a work area where data is appropriately rewritten by the processor 411. The non-volatile memory area is, for example, a ROM. The volatile memory area is, for example, a RAM.

The auxiliary storage apparatus 413 corresponds to the auxiliary storage portion of the computer. For example, the auxiliary storage device 413 can be EEPROM, HDD, SSD, and the like. The auxiliary storage device 413 stores data used by the processor 411 to perform various processing, data generated by the processing of the processor 411, and the like. The auxiliary storage device 413 may store the above application program.

The application program stored in the main memory 412 or the auxiliary storage device 413 includes a control program described for information processing executed by the checkout machine 40. The method of installing the control program in the main memory 412 or the auxiliary storage device 413 is not particularly limited. The control program can be recorded on a removable recording medium, or the control program can be distributed by communication via a network and installed in the main memory 412 or the auxiliary storage device 413. The recording medium may be in any form such as a CD-ROM or a memory card as long as the medium can store a program and can be read by the device.

The clock 414 functions as a time information source for the checkout machine 40. The processor 411 measures the current date and time (date and time) based on the time information measured by the clock 414.

The change machine interface 415 performs data communication with an automatic change machine. The change machine interface 415 receives data on the amount of money inserted, data on the number of coins stored, and the like from the automatic change machine. The change machine interface 415 transmits change data to the automatic change machine.

The communication interface 416 is connected to the communication network 1. The communication interface 416 communicates data with other devices connected via the communication network 1 according to a communication protocol.

The touch panel 417 is a device that has both an input device and a display device of the checkout machine 40. The touch panel 417 detects the touch position with respect to the displayed image and outputs the touch position information to the processor 411.

The scanner 418 is an example of a reading device that reads a code symbol such as a barcode symbol and a QR code (registered trademark) and outputs the read data to the processor 411. The scanner 418 may be of a type that reads a code symbol by scanning with a laser beam, or may be a type that reads a code symbol from an image captured by an imaging device.

The reader 419 reads the data recorded on the recording medium and outputs the read data to the processor 411. The reader 419 is a magnetic card reader if the recording medium is a magnetic card, and is an IC card reader if the recording medium is a contact IC card. In the case of a recording medium using radio frequency identification (RFID) such as a non-contact IC card or a smartphone, an RFID reader is used as the reader 419.

The printer 420 issues a receipt by printing various character strings, images, or the like on receipt paper. As the printer 420 of this type, for example, a thermal printer, a dot impact printer, or the like can be used. The printer 420 functions as a printing device of the checkout machine 40.

Figure 10:
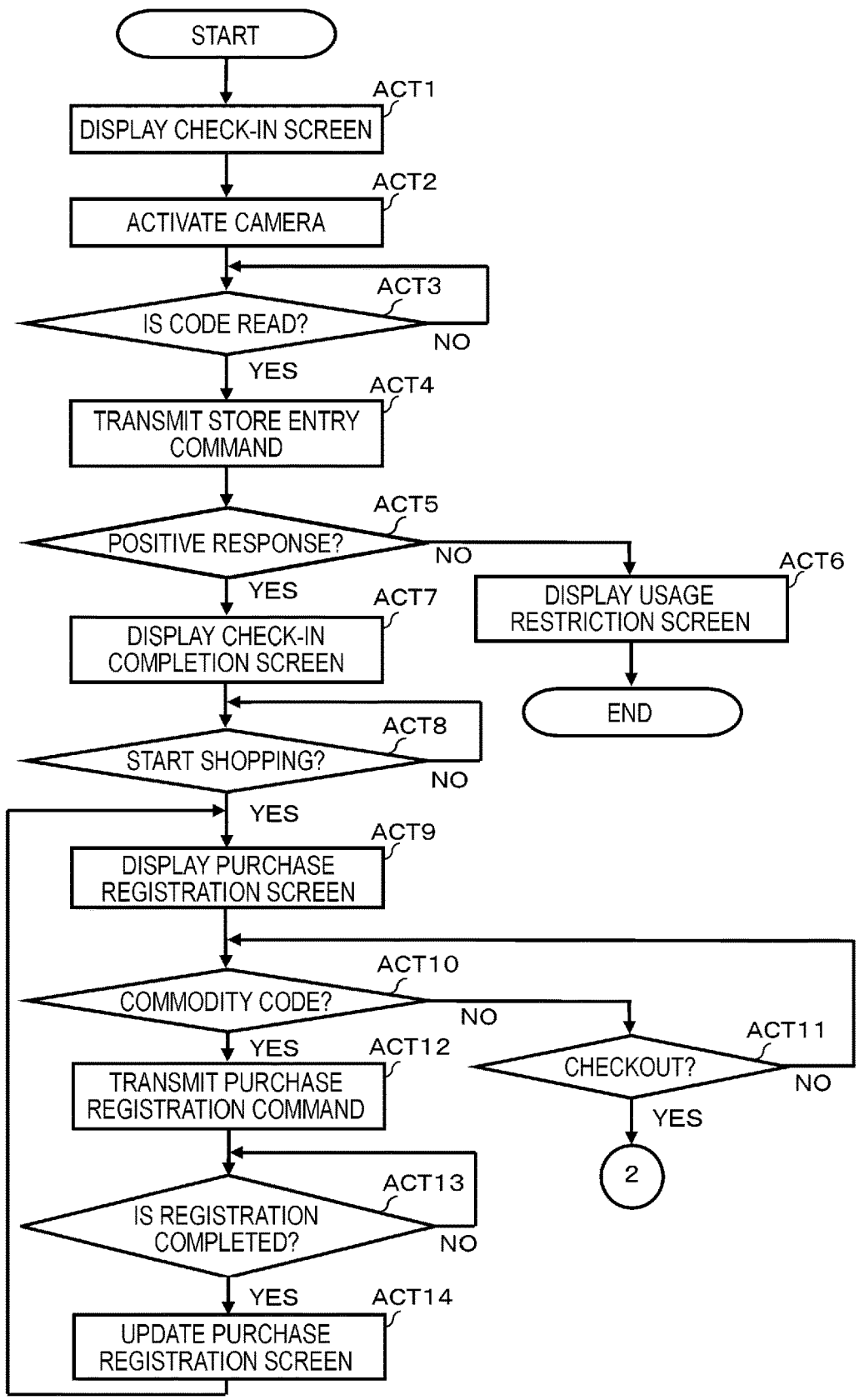
FIG. 10 is a flowchart illustrating a procedure for controlling a main part of a processor in the mobile terminal.
Figure 11:
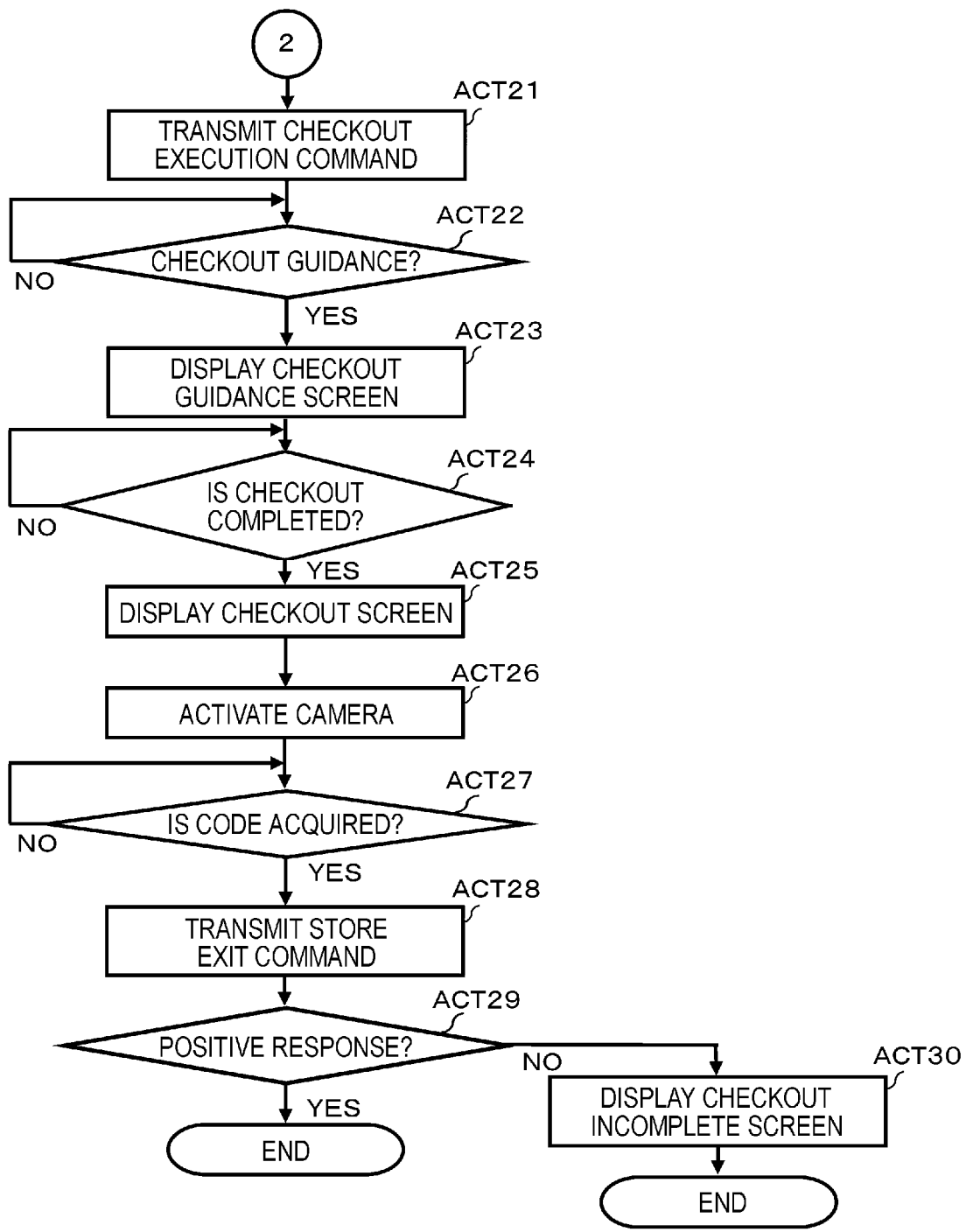
FIG. 11 is a flowchart illustrating a procedure for controlling the main part of the processor in the mobile terminal.
Figure 12:
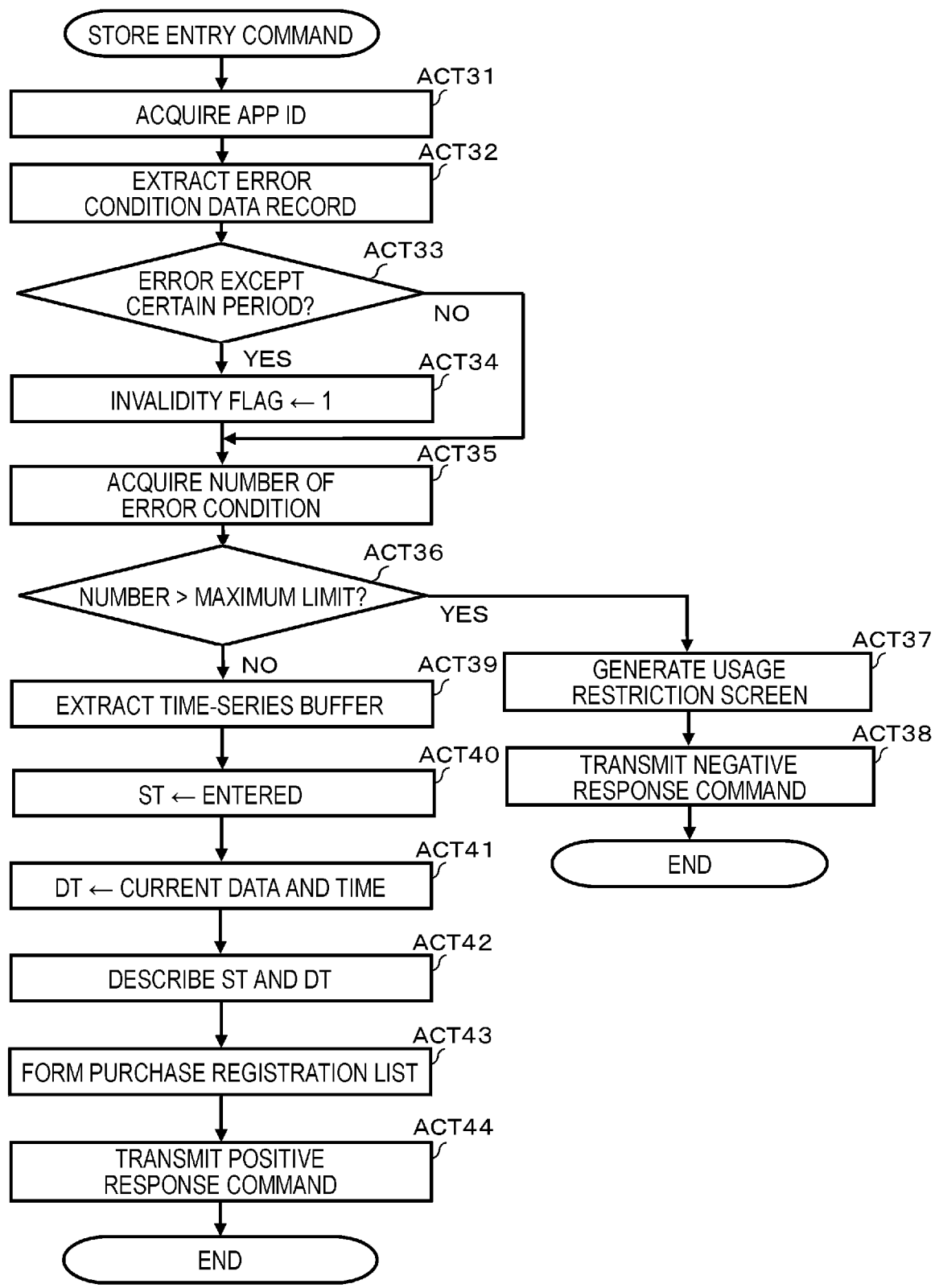
FIG. 12 is a flowchart illustrating a procedure for controlling a main part of a processor in the virtual POS server.

FIGS. 10 and 11 are flowcharts illustrating a procedure for controlling a main part executed by the processor 61 of the mobile terminal 60 according to a control program. FIGS. 12 to 14, 14, 16, 17 and 19 are flowcharts illustrating a procedure for controlling a main part executed by the processor 21 of the virtual POS server 20 according to a control program. FIG. 15 is a flowchart illustrating a procedure for controlling a main part executed by the processor 411 of the checkout machine 40 according to a control program. FIG. 18 is a flowchart illustrating a procedure for controlling a main part executed by the processor 31 of the connection management server 30 according to a control program. Hereinafter, the main operations of the terminal management system SYA will be described with reference to the drawings. The content of the operation described below is an example. As long as similar results can be obtained, the operation procedure and contents are not particularly limited.

First, if the user goes to a store where the terminal management system SYA is installed, the shopping app installed on the mobile terminal 60 owned by the user is started before starting shopping. Then, the processor 61 starts information processing of the procedure illustrated in the flowchart of FIG. 10.

In the present embodiment, the connection management server 30 acquires the app ID from the mobile terminal 60 that activated the shopping app. Then, the connection management server 30 describes the app ID and "connected" as the communication connection condition in the connection management table 321.

First, the processor 61 controls the touch panel 64 so that a check-in screen is displayed as ACT 1. On the check-in screen, for example, a message instructing to read the data code for entering the store and an image of an "OK" button for instructing the user to confirm the message are displayed. The user who confirms the check-in screen touches the "OK" button.

If the "OK" button on the check-in screen is touched, the processor 61 starts up the camera 65 as ACT 2. Then, the processor 61 controls the touch panel 64 so that a camera screen is displayed. On the camera screen, for example, an image illustrating a reading area of a two-dimensional code is displayed. The user who confirms the camera screen holds the lens of the camera 65 over the data code for entering the store so that the data code for entering the store prepared at the entrance of the store fits in the image indicating the reading area.

The processor 61 waits for the camera 65 to read the data code for entering the store as ACT 3. If the data code for entering the store fits within the image illustrating the reading area, the processor 61 determines that the data code for entering the store is read. The processor 61 determines YES in ACT 3 and proceeds to ACT 4.

The processor 61 controls the wireless unit 66 to send a store entry command to the virtual POS server 20 as ACT 4. Therefore, the wireless unit 66 wirelessly transmits the store entry command. The store entry command is received by the access point 50 and sent to the virtual POS server 20 via the communication network 1. The store entry command includes the app ID.

If the processor 21 of the virtual POS server 20 receives a command from the mobile terminal 60 via the communication interface 25, the processor 21 confirms the type of the command. Then, if the reception command is a store entry command, the processor 21 starts the command reception processing of the procedure illustrated in the flowchart of FIG. 12.

The processor 21 acquires the app ID from the store entry command as ACT 31. Then, the processor 21 extracts the error condition data record 2321 identified by the app ID as ACT 32 from the error condition file 232.

As ACT 33, the processor 21 confirms whether the error condition data record 2321 has error raised date outside the certain period. The certain period is stored in, for example, the auxiliary storage device 23. If there is no error raised date outside the certain period, the processor 21 determines NO in ACT 33 and proceeds to ACT 35. The processing of ACT 35 will be described later.

If there is error raised date outside the certain period, the processor 21 determines YES in ACT 33 and proceeds to ACT 34. The processor 21 sets the invalidity flag of the same line as the error raised date outside the certain period to "1" as ACT 34. That is, all items on the same line as the invalidity flag with "1" set are invalidated. If the error condition data record 2321 has a plurality of error raised dates outside the certain period, the invalidity flag on the same line as each error raised date is set to "1".

The processor 21 acquires the number of error conditions from the error condition data record 2321 as ACT 35. Specifically, the processor 21 acquires the number of invalidity flags set to "0", that is, the number of pieces of valid error condition data including the error raised date during the certain period.

The processor 21 confirms whether the number of error conditions exceeds the maximum limit by the function of the restriction unit 213 as ACT 36. The maximum limit is stored in, for example, the auxiliary storage device 23. How to set the maximum limit is freely selected. The maximum limit may be a fixed value in the virtual POS server 20, or may be changed to a desired value depending on the store that manages the virtual POS server 20. If the maximum limit is exceeded, it is determined as YES in ACT 36 and the processing proceeds to ACT 37.

The processor 21 generates a usage restriction screen and a first error condition list screen as ACT 37 based on the error condition data record 2321. The usage restriction screen and the first error condition list screen will be described later.

The processor 21 controls the communication interface 25 as ACT 38 to send a negative response command to the mobile terminal 60 by the function of the output unit 214. Therefore, the negative response command is transmitted via the communication interface 25. The negative response command is wirelessly transmitted from the access point 50 via the communication network 1 and received by the mobile terminal 60 that is the source of the store entry command. The negative response command includes the image data of the usage restriction screen and the image data of the first error condition list screen. With the above, the processor 21 ends the processing of receiving the store entry command.

If the number of error conditions does not exceed the maximum limit, it is determined as NO in ACT 36 and proceeds to ACT 39. The processor 21 extracts the time-series buffer 231 identified by the app ID as ACT 39.

The processor 21 sets the status ST to "entered" by the function of the acquisition unit 211 as ACT 40. The processor 21 acquires the current date and time DT clocked by the clock 24 as ACT 41. Then, the processor 21 describes the current date and time DT and the status ST in association with each other in the time-series buffer 231 extracted by the processing of ACT 39 as ACT 42.

The processor 21 forms the purchase registration list 221 in the main memory 22 as ACT 43. Then, the processor 21 stores the app ID in the purchase registration list 221.

The processor 21 controls the communication interface 25 to send a positive response command to the mobile terminal 60 as ACT 44. Therefore, the positive response command is transmitted via the communication interface 25. The positive response command is wirelessly transmitted from the access point 50 via the communication network 1 and received by the mobile terminal 60 that is the source of the store entry command. With the above, the processor 21 ends the processing of receiving the store entry command.

Returning to the description of FIG. 10, the processor 61 of the mobile terminal 60, which controls the transmission of the store entry command in ACT 4, waits for a response command from the virtual POS server 20 as ACT 5. If the negative response command is received from the virtual POS server 20, the processor 61 determines NO in ACT 5 and proceeds to ACT 6.

The processor 61 controls the touch panel 64 so that a usage restriction screen 100 (see FIG. 20) is displayed as ACT 6. With the above, the processor 61 ends the information processing of the procedure illustrated in the flowchart of FIG. 10.

Figure 20:
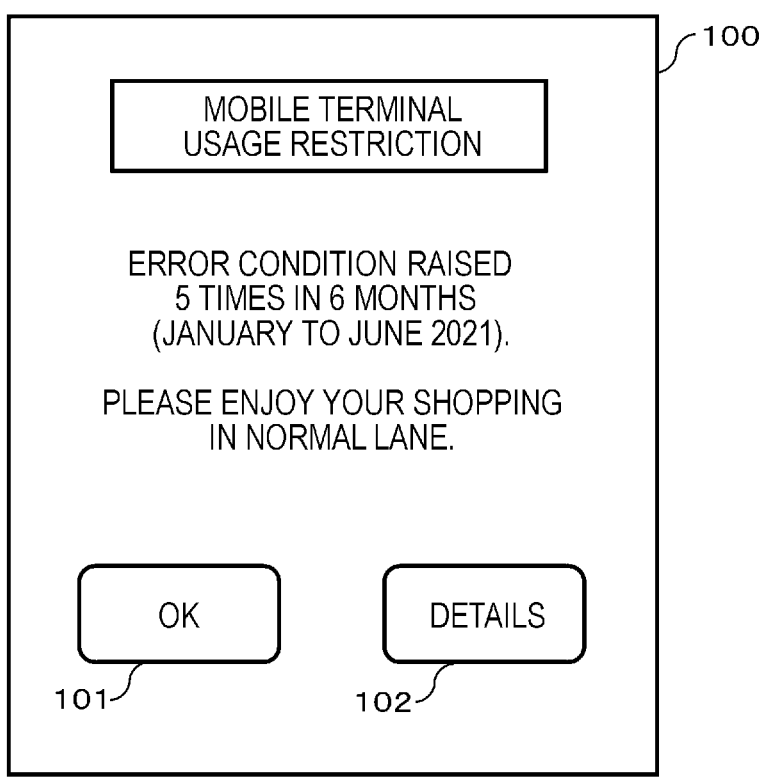
FIG. 20 is a diagram illustrating an example of a usage restriction screen.

FIG. 20 is a diagram illustrating an example of the usage restriction screen 100. As illustrated in FIG. 20, on the usage restriction screen 100, a message is displayed to notify the user of a certain period and the number of error conditions that are raised during the certain period, and that the user will be shopping in a normal lane due to the error condition raised. Shopping in the normal lane means that the store clerk performs the registration operation and the checkout processing operation of purchased commodities with the manned checkout machine 401. Shopping in the normal lane means that the user cannot perform the registration operation of purchase commodities using the mobile terminal 60 and the checkout processing operation using the self-service checkout machine 402. That is, the purchase processing (transaction) by the mobile terminal 60 is restricted. The image of an "OK" button 101 for instructing the user to confirm the message and a "details" button 102 for instructing the user to browse the list of the error conditions are displayed. The user who confirms the usage restriction screen 100 touches the "OK" button 101. If the "OK" button 101 is touched, the shopping app ends. The user will generally shop in the normal lane. The user who wants to browse the list of the error conditions touches the "details" button 102. If the "details" button 102 is touched, a first error condition list screen 200 (see FIG. 21) is displayed. The text data and image contents displayed in FIG. 20 are examples.

Figure 21:
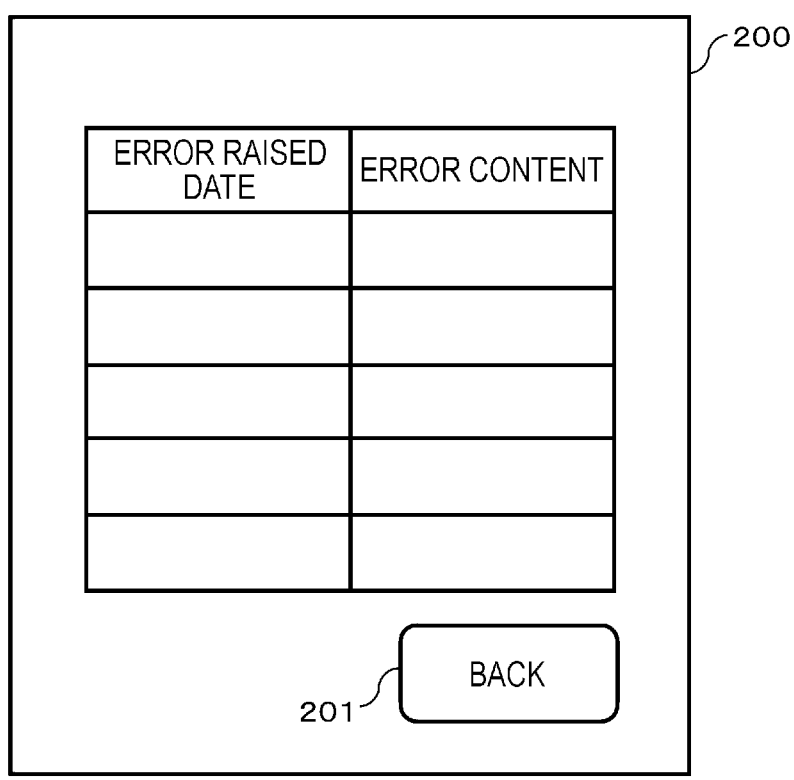
FIG. 21 is a diagram illustrating an example of a first error condition list screen.

FIG. 21 is a diagram illustrating an example of the first error condition list screen 200. As illustrated in FIG. 21, on the first error condition list screen 200, a list in which the error raised date and the error content are described is displayed. That is, on the first error condition list screen 200, a list related to the error condition of the mobile terminal 60 is displayed. An image of a "back" button 201 for instructing the user to return from the first error condition list screen 200 to the usage restriction screen 100 is displayed. If the "back" button 201 is touched, the usage restriction screen 100 is displayed again.

Returning to the description of FIG. 10, if the positive response command is received from the virtual POS server 20, the processor 61 determines YES in ACT 5 and proceeds to ACT 7.

The processor 61 controls the touch panel 64 so that a check-in completion screen is displayed as ACT 7. On the check-in completion screen, for example, an image of an "OK" button is displayed along with a message indicating that shopping is ready. The user who confirms the check-in completion screen touches the "OK" button.

The processor 61, which controls the display of the check-in completion screen, waits for an instruction to start shopping as ACT 8. If the "OK" button on the check-in completion screen is touched, the processor 61 determines that shopping start is instructed. The processor 61 determines YES in ACT 8 and proceeds to ACT 9.

The processor 61 controls the touch panel 64 so that a purchase registration screen is displayed as ACT 9. On the purchase registration screen, for example, an area for displaying the commodity name, unit price, the number of items, purchased amount, and total amount of the purchased commodities is formed. An image of a "checkout" button for instructing checkout is displayed.

The user who confirms the purchase registration screen goes around the sales floor and puts the purchased commodity in a container such as a shopping bag or a shopping cart. For example, the user holds the lens of the camera 65 on the barcode attached to the purchased commodity when putting the purchased commodity in the container. If the barcode is read by the camera 65, the commodity code represented by the barcode is input to the mobile terminal 60.

The processor 61 confirms whether the commodity code was acquired as ACT 10. When confirming that the commodity code was acquired, the processor 61 determines YES in ACT 10 and proceeds to ACT 12.

The processor 61 controls the wireless unit 66 to send a purchase registration command as ACT 12 to the virtual POS server 20. Therefore, the wireless unit 66 wirelessly transmits the purchase registration command. The purchase registration command is received by the access point 50 and sent to the virtual POS server 20 via the communication network 1. The purchase registration command includes the app ID and the commodity code of the purchased commodity.

Figure 13:
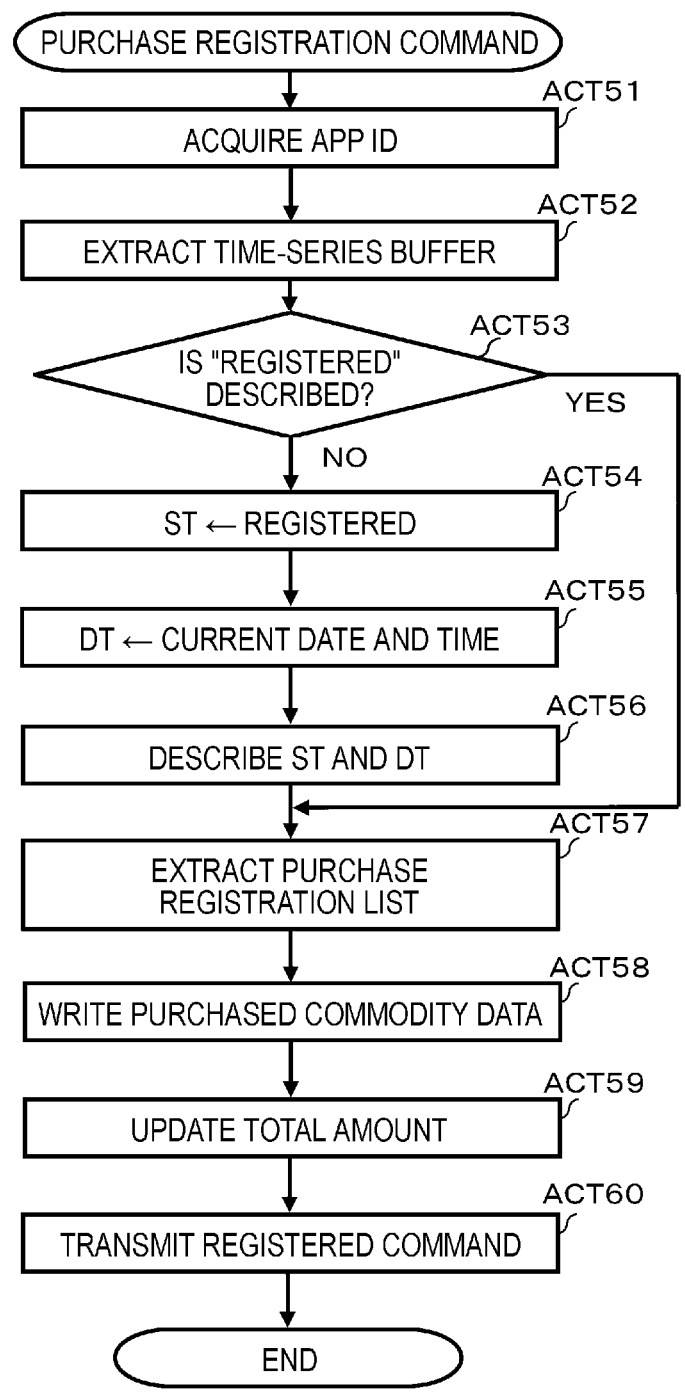
FIG. 13 is a flowchart illustrating a procedure for controlling the main part of the processor in the virtual POS server.

If the processor 21 of the virtual POS server 20 receives the purchase registration command from the mobile terminal 60 via the communication interface 25, the processor 21 starts the command reception processing of the procedure illustrated in the flowchart of FIG. 13.

The processor 21 acquires the app ID from the purchase registration command as ACT 51. Then, the processor 21 extracts the time-series buffer 231 identified by the app ID as ACT 52.

The processor 21 confirms whether "registered" as the status ST is described in the last line of the time-series buffer 231 as ACT 53. If "registered" is described in the last line of the time-series buffer 231 as the status ST, it means that the purchased commodity is already registered and the commodity is a second or subsequent purchased commodity. Therefore, if "registered" is described as the status ST, the processor 21 determines YES in ACT 53 and proceeds to ACT 57. The processing of ACT 57 will be described later.

If "registered" is not described as the status ST, that is, if the purchased commodity is a first purchased commodity, the processor 21 determines NO in ACT 53 and proceeds to ACT 54. The processor 21 sets the status ST to "registered" by the function of the acquisition unit 211 as ACT 54.

The processor 21 acquires the current date and time DT clocked by the clock 24 as ACT 55. Then, the processor 21 describes the current date and time DT and the status ST in association with each other in the time-series buffer 231 extracted by the processing of ACT 52 as ACT 56.

The processor 21 extracts the purchase registration list 221 identified by the app ID as ACT 57. The processor 21 generates the purchased commodity data 2211 based on the commodity code included in the purchase registration command as ACT 58, and writes the purchased commodity data 2211 in the purchase registration list 221. The processor 21 updates the total amount of the purchase registration list 221 as ACT 59 to the amount obtained by adding the purchase amount of the newly written purchased commodity data 2211.

The processor 21 controls the communication interface 25 to send a registration command to the mobile terminal 60 as ACT 60. By this control, the registration command is transmitted via the communication interface 25. The registration command is wirelessly transmitted from the access point 50 via the communication network 1 and received by the mobile terminal 60 that is the source of the purchase registration command. The registration command includes the purchase registration list 221. With the above, the processor 21 ends the processing of receiving the purchase registration command.

Returning to the description of FIG. 10, the processor 61 of the mobile terminal 60, which controls the transmission of the purchase registration command in ACT 12, waits for a registration command from the virtual POS server 20 as ACT 13. If the registration command is received from the virtual POS server 20, the processor 61 determines YES in ACT 13 and proceeds to ACT 14.

The processor 61 updates the purchase registration screen as ACT 14. That is, the processor 61 updates the purchase registration screen so that the commodity name, unit price, the number of items, and purchased amount of the purchased commodities are added and the purchased amount is added to the total amount. The processor 61 then returns to ACT 9.

If the commodity code is not acquired, the processor 61 determines NO in ACT 10 and proceeds to ACT 11. The processor 61 checks to see if the "checkout" button is touched as ACT 11. As described above, an image of the "checkout" button is displayed on a part of the purchase registration screen. The user who finished the purchase touches the "checkout" button. If the "checkout" button is touched, the processor 61 determines that checkout was instructed. If the "checkout" button is not touched, the processor 61 determines NO in ACT 11 and returns to ACT 10. That is, the processor 61 returns to the standby state of ACT 10 to ACT 11.

When confirming that the checkout was instructed, the processor 61 determines YES in ACT 11 and proceeds to ACT 21 in FIG. 11. The processor 61 controls the wireless unit 66 to send a checkout execution command to the virtual POS server 20 as ACT 21. Therefore, the wireless unit 66 wirelessly transmits the checkout execution command. The checkout execution command is received by the access point 50 and sent to the virtual POS server 20 via the communication network 1. The checkout execution command includes the app ID stored in the external memory 63.

Figure 14:
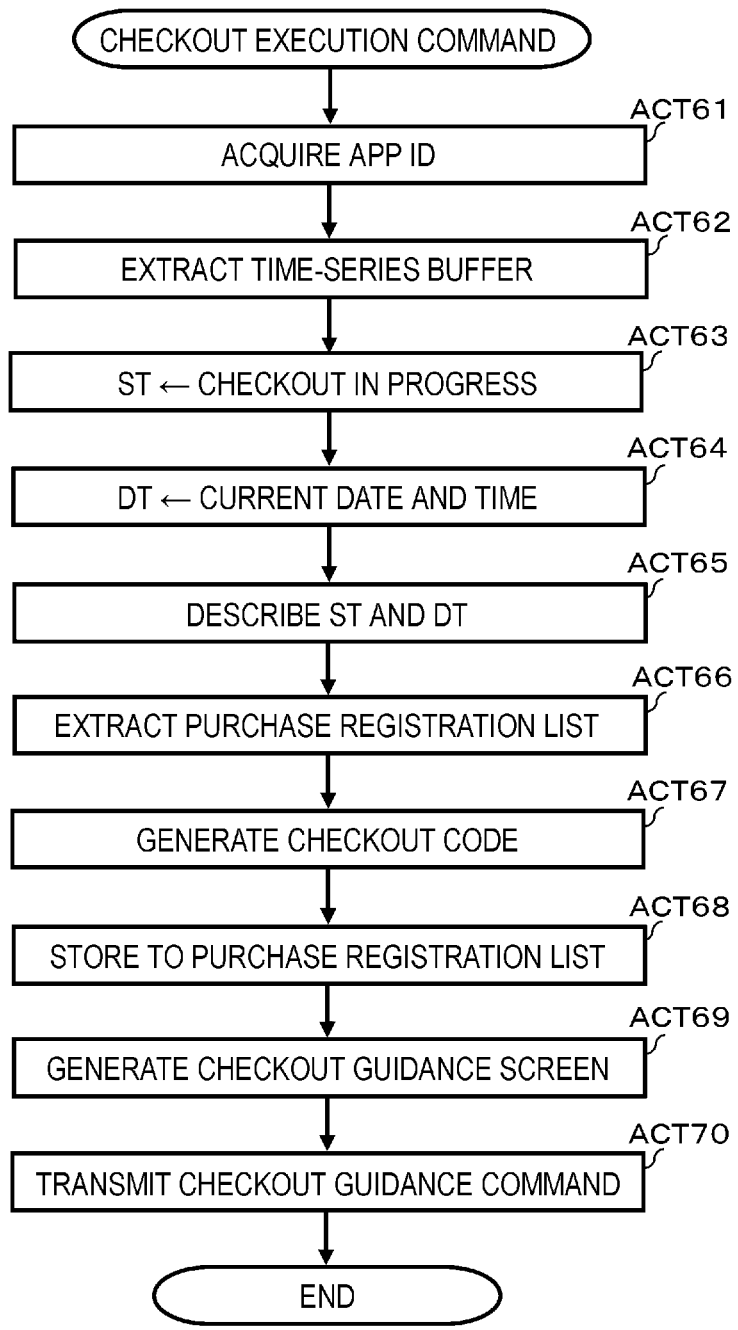
FIG. 14 is a flowchart illustrating a procedure for controlling the main part of the processor in the virtual POS server.
Figure 15:
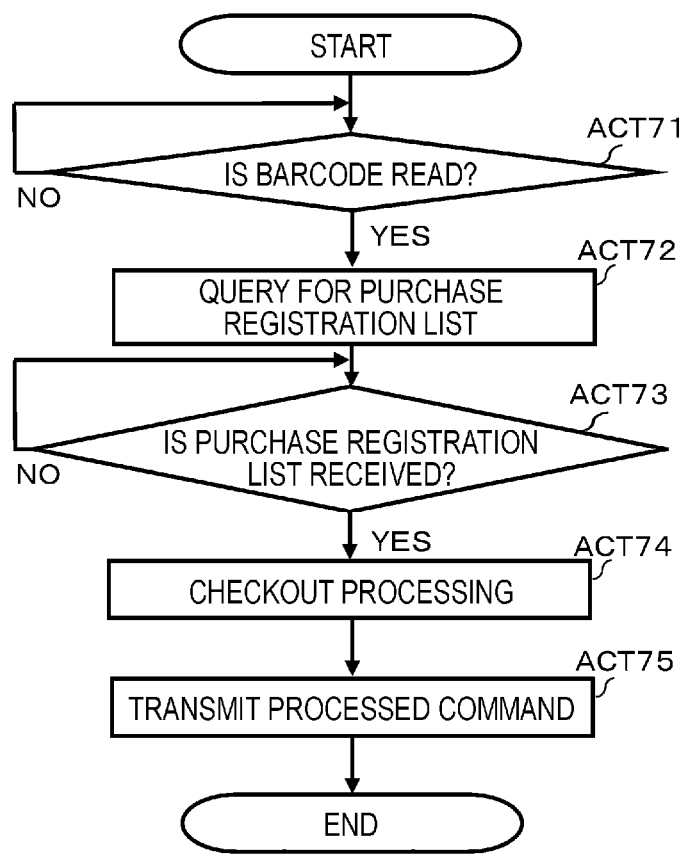
FIG. 15 is a flowchart illustrating a procedure for controlling a main part of a processor in the checkout machine.

When the processor 21 of the virtual POS server 20 receives a checkout execution command from the mobile terminal 60 via the communication interface 25, the processor 21 starts the command reception processing of the procedure illustrated in the flowchart of FIG. 14.

The processor 21 acquires the app ID from the checkout execution command as ACT 61. Then, the processor 21 extracts the time-series buffer 231 identified by the app ID as ACT 62.

The processor 21 sets the status ST to "checkout in progress" by the function of the acquisition unit 211 as ACT 63. The processor 21 acquires the current date and time DT clocked by the clock 24 as ACT 64. Then, the processor 21 describes the current date and time DT and the status ST in association with each other in the time-series buffer 231 extracted by the processing of ACT 62 as ACT 65.

The processor 21 extracts the purchase registration list 221 identified by the app ID as ACT 66. The processor 21 generates checkout code data as ACT 67. The checkout code is for identifying a user who performs checkout at the checkout machine 40. The checkout code is generated for each user who performs checkout at the checkout machine 40.

The processor 21 stores the checkout code in the purchase registration list 221 as ACT 68. The processor 21 generates a checkout guide screen as ACT 69. On the checkout guide screen, for example, a checkout barcode representing a checkout code generated in ACT 67 and a message prompting the user to read the checkout barcode with the scanner 418 provided in the checkout machine 40 are displayed.

The processor 21 controls the communication interface 25 to send the checkout guidance command to the mobile terminal 60 as ACT 70. Therefore, the checkout guidance command is transmitted via the communication interface 25. The checkout guidance command is wirelessly transmitted from the access point 50 via the communication network 1 and received by the mobile terminal 60 that is the source of the checkout execution command. The checkout guidance command includes image data of the checkout guidance screen generated in ACT 69. With the above, the processor 21 ends the processing of receiving the checkout execution command.

Returning to the description of FIG. 11, the processor 61 of the mobile terminal 60, which controls the transmission of the checkout execution command in ACT 21, waits for a checkout guidance command from the virtual POS server 20 as ACT 22. If a checkout guidance command is received from the virtual POS server 20, the processor 61 determines YES in ACT 22 and proceeds to ACT 23.

The processor 61 controls the touch panel 64 so that the checkout guide screen is displayed as ACT 23. The user who confirms the checkout guide screen goes to the installation location of the available checkout machine 40 and reads the checkout barcode with the scanner 418 provided in the checkout machine 40. Then, the processor 411 of the checkout machine 40 starts information processing of the procedure illustrated in the flowchart of FIG. 15.

The processor 411 of the checkout machine 40 waits for a checkout barcode to be read as ACT 71. If the checkout barcode is read, the processor 411 determines YES in ACT 71 and proceeds to ACT 72.

The processor 411 queries the virtual POS server 20 for the purchase registration list 221 with the checkout barcode read as ACT 72. In response to the inquiry, the virtual POS server 20 extracts the purchase registration list 221 in which the inquired checkout barcode is stored, and sends the purchase registration list 221 to the checkout machine 40. The processor 411 then waits to receive the purchase registration list 221 as ACT 73. If the purchase registration list 221 is received, the processor 411 determines YES in ACT 73 and proceeds to ACT 74.

The processor 411 executes checkout processing based on the purchased commodity data 2211 in the purchase registration list 221 received as ACT 74. Since the checkout processing is well known in the related arts, specific description will be omitted.

The processor 411 controls communication interface 416 to send the processed command to the virtual POS server 20 as ACT 75. Therefore, the processed command is transmitted via the communication interface 416. The processed command is received by the virtual POS server 20 via the communication network 1. The processed command includes the app ID stored in the purchase registration list 221. With the above, the processor 411 ends the information processing of the procedure illustrated in the flowchart of FIG. 15.

Figure 16:
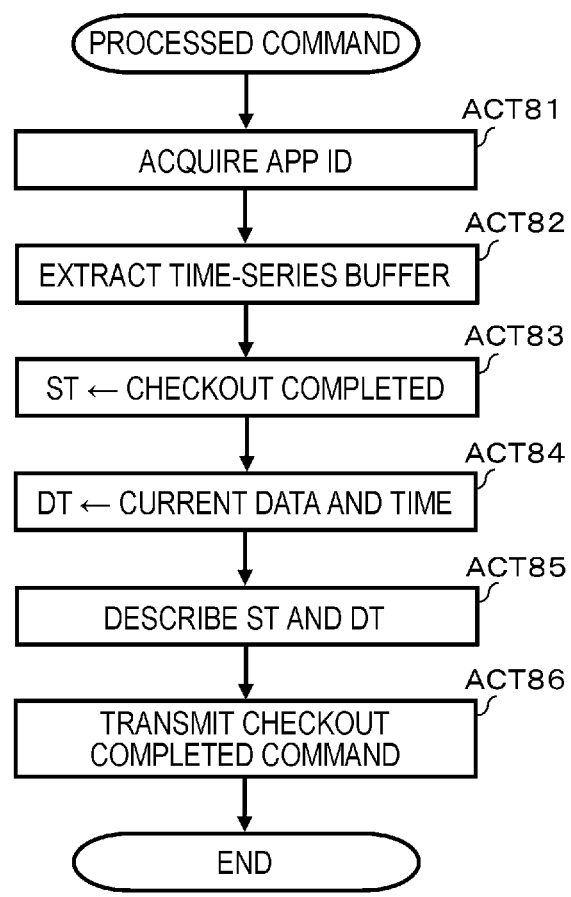
FIG. 16 is a flowchart illustrating a procedure for controlling the main part of the processor in the virtual POS server.

If the processor 21 of the virtual POS server 20 receives the processed command from the checkout machine 40 via the communication interface 25, the processor 21 starts the command reception processing of the procedure illustrated in the flowchart of FIG. 16.

The processor 21 acquires the app ID from the processed command as ACT 81. The processor 21 extracts the time-series buffer 231 identified by the app ID as ACT 82.

The processor 21 sets the status ST to "checkout completed" by the function of the acquisition unit 211 as ACT 83. The processor 21 acquires the current date and time DT clocked by the clock 24 as ACT 84. Then, the processor 21 describes the current date and time DT and the status ST in association with each other in the time-series buffer 231 extracted by the processing of ACT 82 as ACT 85.

The processor 21 controls the communication interface 25 to send a checkout completed command to the mobile terminal 60 as ACT 86. Therefore, the checkout completed command is transmitted via the communication interface 25. The checkout completed command is wirelessly transmitted from the access point 50 via the communication network 1 and received by the mobile terminal 60. The checkout completed command includes an app ID. With the above, the processor 21 ends the processing of receiving the processed command.

Returning to the description of FIG. 11, the processor 61 that displays the checkout guide screen waits for a checkout command from the virtual POS server 20 as ACT 24. If the checkout completed command is received from the virtual POS server 20, the processor 61 determines YES in ACT 24 and proceeds to ACT 25.

The processor 61 controls the touch panel 64 so that a checkout screen is displayed as ACT 25. On the checkout screen, for example, a message instructing to read the data code for exiting the store and an image of an "OK" button for instructing the user to confirm the message are displayed. The user who confirms the checkout screen touches the "OK" button.

If the "OK" button on the checkout screen is touched, the processor 61 starts up the camera 65 as ACT 26. Then, the processor 61 controls the touch panel 64 so that a camera screen is displayed. The user who confirms the camera screen holds the lens of the camera 65 over the data code for exiting the store so that the data code for exiting the store prepared at the exit of the store fits in the image indicating the reading area.

The processor 61 that displays the camera screen waits for the camera 65 to read the data code for exiting the store as ACT 27. If the data code for exiting the store fits within the image illustrating the reading area, the processor 61 determines that the data code for exiting the store was read. The processor 61 determines YES in ACT 27 and proceeds to ACT 28.

The processor 61 controls the wireless unit 66 to send a store exit command to the virtual POS server 20 as ACT 28. Therefore, the wireless unit 66 wirelessly transmits the store exit command. The store exit command is received by the access point 50 and sent to the virtual POS server 20 via the communication network 1. The store exit command includes an app ID.

Figure 17:
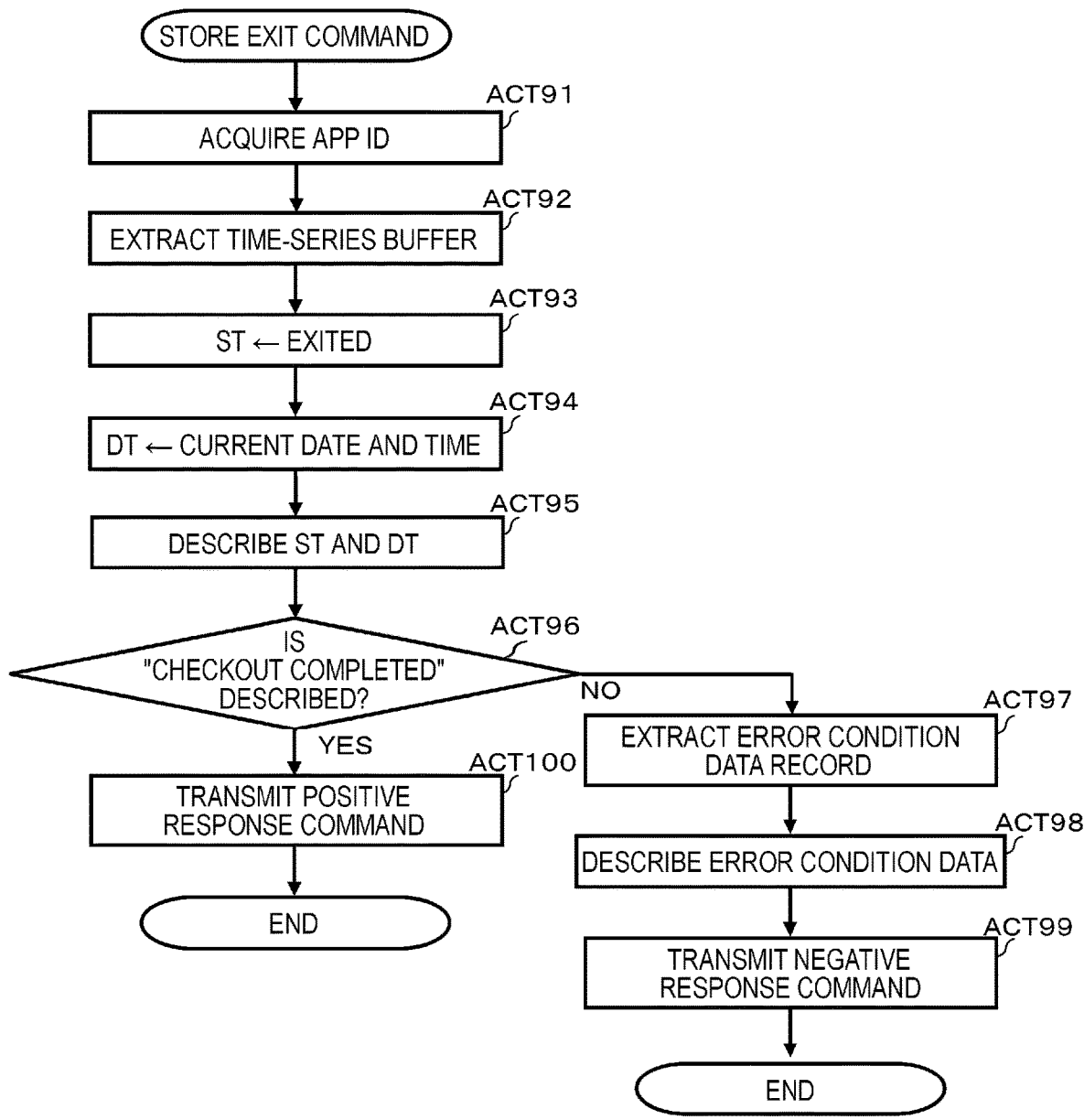
FIG. 17 is a flowchart illustrating a procedure for controlling the main part of the processor in the virtual POS server.
Figure 18:
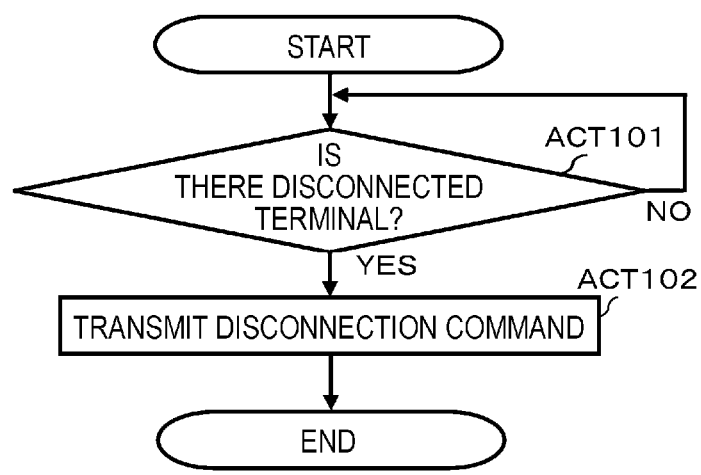
FIG. 18 is a flowchart illustrating a procedure for controlling a main part of a processor in the connection management server.

If the processor 21 of the virtual POS server 20 receives a store exit command from the mobile terminal 60 via the communication interface 25, the processor 21 starts the command reception processing of the procedure illustrated in the flowchart of FIG. 17.

The processor 21 acquires the app ID from the store exit command as ACT 91. Then, the processor 21 extracts the time-series buffer 231 identified by the app ID as ACT 92.

The processor 21 sets the status ST to "exited" by the function of the acquisition unit 211 as ACT 93. The processor 21 acquires the current date and time DT measured by the clock 24 as ACT 94. Then, the processor 21 describes the current date and time DT and the status ST in association with each other in the time-series buffer 231 extracted by the processing of ACT 92 as ACT 95.

The processor 21 confirms whether "checkout completed" is described as the status ST in the time-series buffer 231 by the function of the detection unit 212 as ACT 96. Specifically, the processor 21 confirms whether the date is the same day as the current date and time DT if "exited" is described as the status ST in the processing of ACT 95 and "checkout completed" is described as the status ST at a time before the current date and time DT.

If "checkout completed" is not described as the status ST, that is, "entered", "registered", "checkout in progress", and "exited" are described as the status ST, but "checkout completed" is not described before "exited", it means that the user performed the registration operation of the purchased commodity at the store, but performed an operation of exiting the store without completing the checkout. Therefore, if "checkout completed" is not described as the status ST, the processor 21 determines NO in ACT 96 and proceeds to ACT 97.

The processor 21 extracts the error condition data record 2321 identified by the app ID as ACT 97 from the error condition file 232. The processor 21 describes the error condition data in the error condition data record 2321 as ACT 98. Specifically, the processor 21 describes the error condition data record 2321 in association with the current date and time DT acquired in the processing of ACT 94 as the error raised date and "checkout incomplete" as the error content. The processor 21 sets the invalidity flag on the same line as the error raised date and the error content described in association to "0".

The processor 21 controls the communication interface 25 to send a negative response command to the mobile terminal 60 as ACT 99. Therefore, the negative response command is transmitted via the communication interface 25. The negative response command is wirelessly transmitted from the access point 50 via the communication network 1 and received by the mobile terminal 60 that is the source of the store exit command. With the above, the processor 21 ends the processing of receiving the store exit command.

If "checkout completed" is described as the status ST, the processor 21 determines YES in ACT 96 and proceeds to ACT 100. The processor 21 controls the communication interface 25 to send a positive response command to the mobile terminal 60 as ACT 100. Therefore, the positive response command is transmitted via the communication interface 25. The positive response command is wirelessly transmitted from the access point 50 via the communication network 1 and received by the mobile terminal 60 that is the source of the store exit command. With the above, the processor 21 ends the processing of receiving the store exit command.

Returning to the description of FIG. 11, if the processor 61 of the mobile terminal 60 that controls the transmission of the store exit command in ACT 28 receives a positive response command from the virtual POS server 20 as ACT 29, the processor 61 determines YES in ACT 29, and ends the information processing of the procedure illustrated in the flowcharts of FIGS. 10 and 11.

If the negative response command is received from the virtual POS server 20, the processor 61 determines NO in ACT 29 and proceeds to ACT 30. The processor 61 controls the touch panel 64 so that a checkout incomplete screen is displayed as ACT 30. On the checkout incomplete screen, for example, a message for notifying that the checkout is not completed and an image of an "OK" button for instructing the user to confirm the message are displayed. The user who confirms the checkout incomplete screen touches the "OK" button to return to the purchase registration screen and touch the "checkout" button. The information processing of the procedure illustrated in the flowcharts of FIGS. 10 and 11 is completed.

By the way, the connection management server 30 manages the mobile terminal 60 that is connected to the wireless LAN in the store but is no longer connected, in the connection management file 321, due to reasons such as the battery of the mobile terminal 60 run out, some problem occurred in the connection to the wireless LAN, the user intentionally disconnected from the wireless LAN, the user ended the shopping app and exited the store. That is, the processor 31 of the connection management server 30 waits for the existence of the app ID in which "disconnected" is described as the communication connection condition among the app IDs described in the connection management table 321 as ACT 101 in FIG. 18. If there is an app ID in which "disconnected" is described as the communication connection condition, the processor 31 determines YES in ACT 101 and proceeds to ACT 102.

The processor 31 controls the communication interface 34 as ACT 102 to send a disconnection command to the virtual POS server 20. Therefore, the disconnection command is transmitted via the communication interface 34. The disconnection command is received by the virtual POS server 20 via the communication network 1. The disconnection command includes an app ID in which "disconnected" is described as the communication connection condition. With the above, the processor 31 ends the information processing of the procedure illustrated in the flowchart of FIG. 18.

Figure 19:
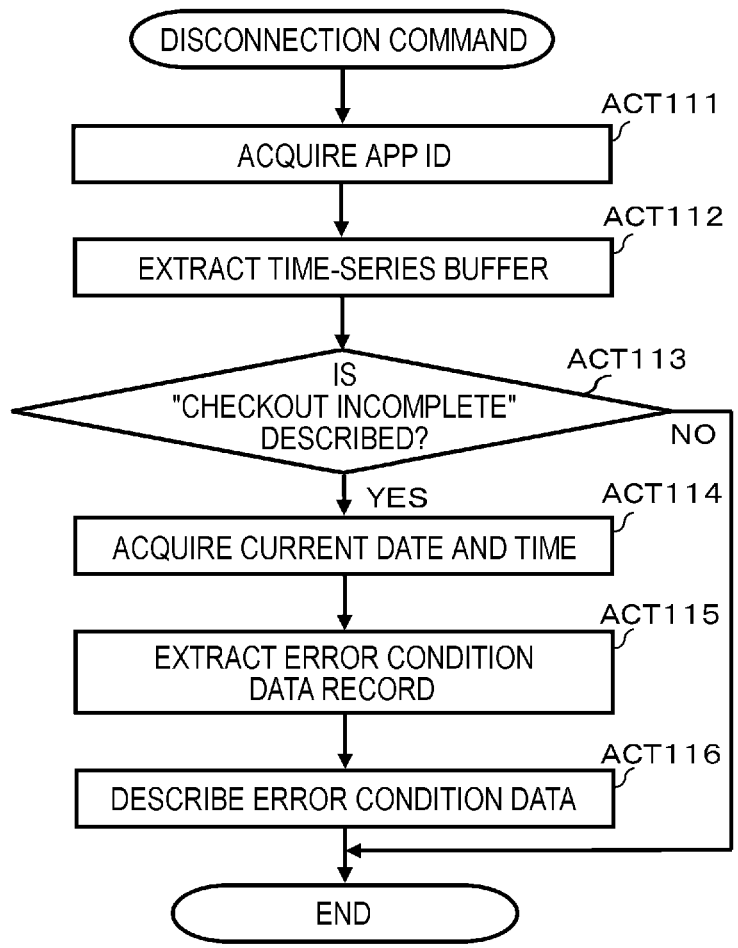
FIG. 19 is a flowchart illustrating a procedure for controlling the main part of the processor in the virtual POS server.

If the processor 21 of the virtual POS server 20 receives a disconnection command from the connection management server 30 via the communication interface 25, the processor 21 starts the command reception processing of the procedure illustrated in the flowchart of FIG. 19.

The processor 21 acquires the app ID from the disconnection command as ACT 111. Then, the processor 21 extracts the time-series buffer 231 identified by the app ID as ACT 112.

The processor 21 confirms whether the data indicating the checkout currently incomplete is described in the time-series buffer 231 by the function of the detection unit 212 as ACT 113.

If the data indicating the checkout currently incomplete is not described, that is, if the user has completed the checkout at the store, it is conceivable that the mobile terminal 60 is no longer connected to the wireless LAN in the store because the user ended the shopping app and exited the store, for example. Therefore, if the data indicating the checkout currently incomplete is not described, the processor 21 determines NO in ACT 113 and ends the processing of receiving the disconnection command.

If the data indicating the checkout currently incomplete is described, it means that the user is registering the purchased product at the store, although checkout is not completed, in such a case where "entered" and "registered" are described as the status ST in the time-series buffer 231, but "checkout completed" is not described, or a case where "entered", "registered", and "checkout in progress" are described as the status ST in the time-series buffer 231, but "checkout completed" is not described. Therefore, if data indicating the checkout currently incomplete is described, the processor 21 determines YES in ACT 113 and proceeds to ACT 114. The processor 21 acquires the current date and time clocked by the clock 24 as ACT 114.

The processor 21 extracts the error condition data record 2321 identified by the app ID as ACT 115 from the error condition file 232. The processor 21 describes the error condition data in the error condition data record 2321 as ACT 116. Specifically, the processor 21 describes the error condition data record 2321 in association with the current date and time acquired in the processing of ACT 114 as the error raised date and "disconnected with checkout incomplete" as the error content. The processor 21 sets the invalidity flag on the same line as the error raised date and the error content described in association to "0". With the above, the processor 21 ends the processing of receiving the disconnection command.

Therefore, in such the terminal management system SYA, if a store entry command is sent from the mobile terminal 60 to the virtual POS server 20, the number of error conditions that raised during the certain period is acquired from the error condition data record 2321 identified by the app ID included in the store entry command.

If the number of error conditions does not exceed the maximum limit, the current date and time DT and the status ST are described in association with "entered" in the time-series buffer 231 identified by the app ID. Then, the positive response command is sent to the mobile terminal 60. That is, purchase registration is performed by using the mobile terminal 60. If a store exit command is sent from the mobile terminal 60 to the virtual POS server 20, the current date and time DT and the status ST are described in association with "exited" in the time-series buffer 231 identified by the app ID included in the store exit command. If "entered", "registered", "checkout in progress", and "exited" are described as the status ST in the time-series buffer 231, but "checkout completed" is not described before "exited", error condition data (error raised date, error content, and invalidity flag) is described in the error condition data record 2321 identified by the app ID.

If confirming that an app ID exists, in which "disconnected" is described as the communication connection condition of the connection management table 321, that is, an app ID that is connected to the wireless LAN in the store but is no longer connected, the connection management server 30 sends a disconnection command to the virtual POS server 20. If a disconnection command is received by the virtual POS server 20, if "entered" and "registered" are described as the status ST in the time-series buffer 231 identified by the app ID included in the disconnection command, but "checkout completed" is not described, or if "entered", "registered", and "checkout in progress" are described as the status ST, but "checkout completed" is not described, error condition data is described in the error condition data record 2321 identified by the app ID.

On the other hand, if the number of error conditions exceeds the maximum limit, a negative response command including the image data of the usage restriction screen 100 and the image data of the first error condition list screen 200 is transmitted to the mobile terminal 60.

Therefore, it is possible to restrict the purchase processing (transaction) by the mobile terminal 60 for the user who operates the mobile terminal 60 in which an error condition raised.

The usage restriction screen 100 displays the certain period, the number of raised error conditions during the certain period, and a message notifying the user that the purchase processing by the mobile terminal 60 is restricted due to the error conditions raised. Therefore, the user can recognize the error condition raised.

If the "details" button 102 of the usage restriction screen 100 is touched, the first error condition list screen 200 is displayed. Therefore, the user can confirm the details of the raised error condition.

Second Embodiment

Next, a second embodiment will be described with reference to FIGS. 22 to 28.

In the second embodiment, a terminal management system SYB including an aggregation server 90 will be described. In each drawing according to the second embodiment and the description thereof below, the same elements as those in the first embodiment are designated by the same reference numerals. Therefore, the description of the same element may be omitted. FIGS. 2 to 11 and 13 to 20 used in the description of the first embodiment are common to the second embodiment, and thus the description thereof will be omitted here.

Figure 22:
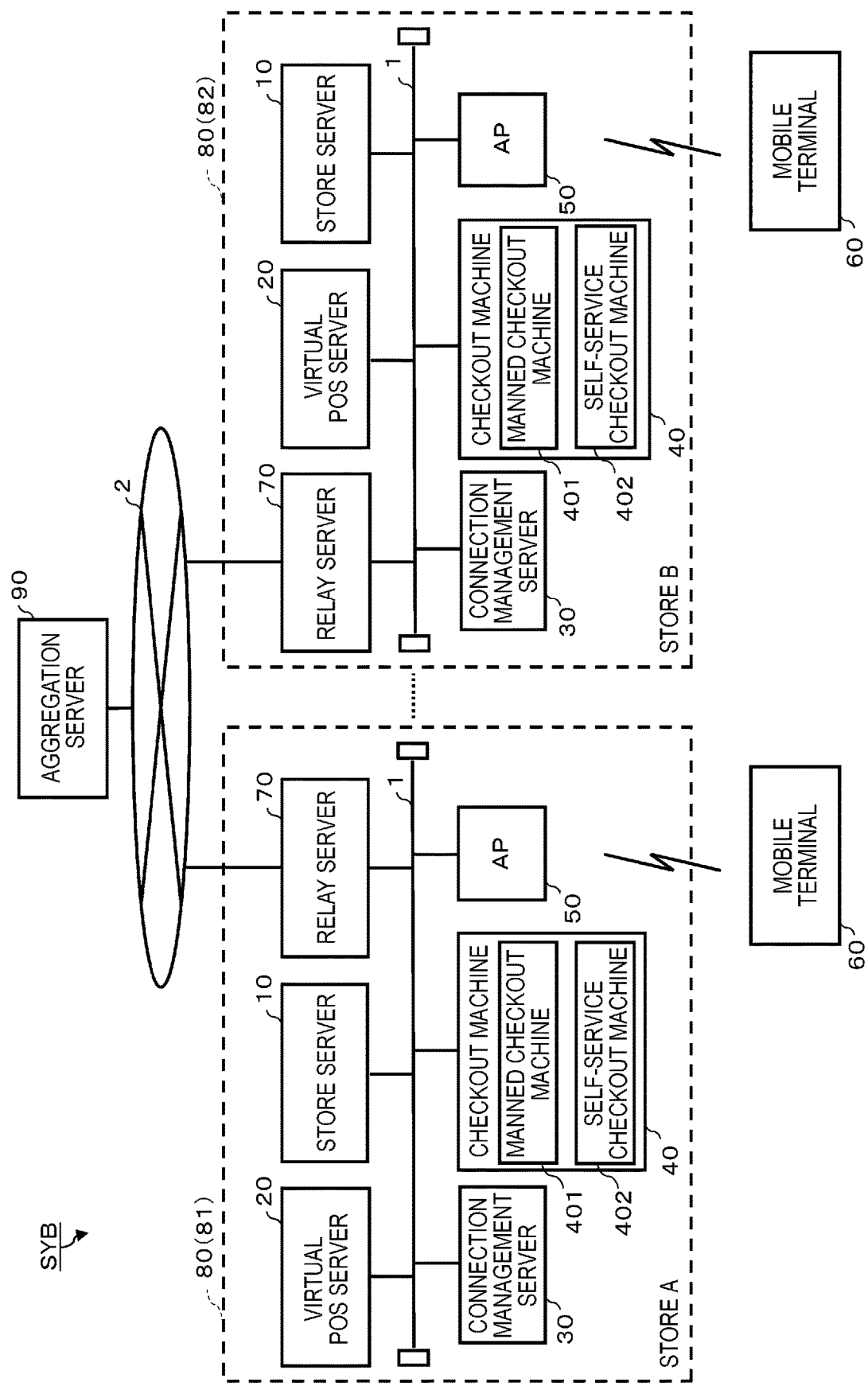
FIG. 22 is a block diagram illustrating a schematic configuration of a terminal management system according to a second embodiment.

FIG. 22 is a block diagram illustrating a schematic configuration of the terminal management system. SYB according to the second embodiment. The terminal management system SYB includes a plurality of store systems 80, the aggregation server 90, a communication network 2, and the plurality of mobile terminals 60. The aggregation server 90 is connected to a relay server 70 via the communication network 2.

The store system 80 is configured for each store in which the terminal management system SYB is installed. The number of stores is not particularly limited. FIG. 22 illustrates the store system 80 configured in a store A and the store system 80 configured in a store B. The business entity that operates the store A may be the same as or different from the business entity that operates the store B. In the following, the store system of the store A is referred to as store system 81, and the store system of the store B is referred to as store system 82. The store systems 81, 82, . . . of each store are collectively referred to, the store system 80.

The basic configuration of the store system 80 is common. That is, the store system 80 includes the store server 10, the virtual POS server 20, the connection management server 30, the checkout machine 40, the access point 50, the mobile terminal 60, and the relay server 70. The store server 10, the virtual POS server 20, the connection management server 30, the checkout machine 40, the access point 50, and the relay server 70 are connected to the communication network 1.

The connection management server 30 manages the communication connection condition of the mobile terminal 60 that communicates with the store system 80. The connection management server 30 manages, for example, whether the mobile terminal 60 is connected to a wireless LAN or the like in the store.

The relay server 70 relays the aggregation server 90 connected to the communication network 2, and each device connected to the communication network 1, that is, the store server 10, the virtual POS server 20, the connection management server 30, the checkout machine 40, and the access point 50. The communication network 2 is typically the Internet. The communication network 2 may be a dedicated closed network or may include a mobile communication network.

The aggregation server 90 collects and aggregates the error condition file 232 managed by the virtual POS server 20 of each store. The aggregation server 90 provides the aggregated data to the virtual POS server 20.

Figure 23:
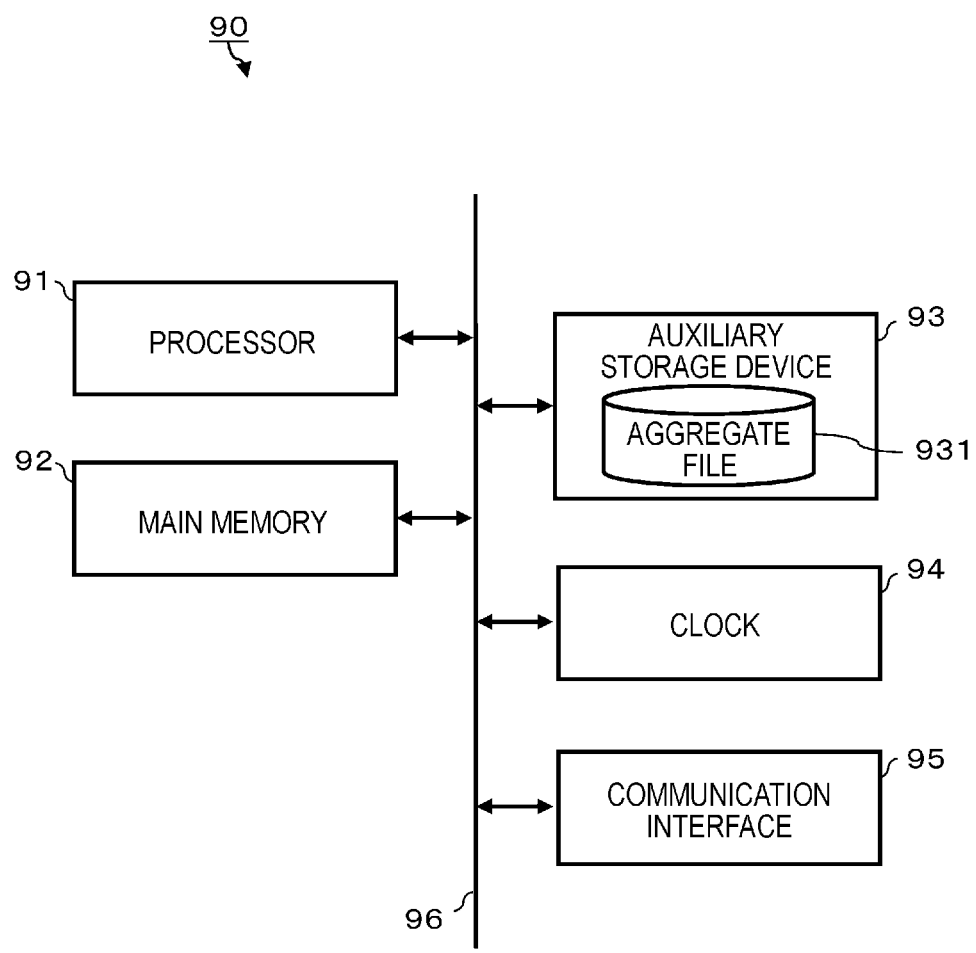
FIG. 23 is a block diagram illustrating a circuit configuration of a main part of an aggregation server in the second embodiment.

FIG. 23 is a block diagram illustrating a circuit configuration of amain part of the aggregation server 90. As illustrated in FIG. 23, the aggregation server 90 includes a processor 91, a main memory 92, an auxiliary storage device 93, a clock 94, a communication interface 95, and a system transmission line 96. The system transmission line 96 includes an address bus, a data bus, a control signal line, and the like. The aggregation server 90 connects the processor 91, the main memory 92, the auxiliary storage device 93, the clock 94, and the communication interface 95 to the system transmission line 96. In the aggregation server 90, a computer is composed of the processor 91, the main memory 92, the auxiliary storage device 93, and the system transmission line 96 connecting therebetween.

The processor 91 corresponds to the central part of the computer. The processor 91 controls each part in order to realize various functions as the aggregation server 90 according to an operating system or an application program. The processor 91 is, for example, a CPU.

The main memory 92 corresponds to the main memory portion of the computer. The main memory 92 includes a non-volatile memory area and a volatile memory area. The main memory 92 stores the operating system or application program in the non-volatile memory area. The main memory 92 may store data necessary for the processor 91 to execute processing for controlling each unit in the non-volatile or volatile memory area. The main memory 92 uses a volatile memory area as a work area where data is appropriately rewritten by the processor 91. The non-volatile memory area is, for example, a ROM. The volatile memory area is, for example, RAM.

The auxiliary storage apparatus 93 corresponds to the auxiliary storage portion of the computer. For example, the auxiliary storage device 93 can be EEPROM (registered trademark), HDD, SSD, and the like. The auxiliary storage device 93 stores data used by the processor 91 to perform various processing, data generated by the processing of the processor 91, and the like. The auxiliary storage device 93 may store the above application program. The auxiliary storage device 93 functions as a storage unit that collects and stores information related to the error condition of the mobile terminal 60.

The clock 94 functions as a time information source for the aggregation server 90. The processor 91 measures the current date and time based on the time information clocked by the clock 94.

The communication interface 95 is connected to the communication network 2. The communication interface 95 performs data communication with the relay server 70 of each store system 80 connected via the communication network 2 according to a communication protocol.

The aggregation server 90 uses apart of the storage area of the auxiliary storage device 93 as the area of an aggregate data file 931. The storage destination of the aggregate data file 931 is not limited to the auxiliary storage device 93. The aggregate data file 931 may be stored in a part of the volatile memory area of the main memory 92.

Figure 24:
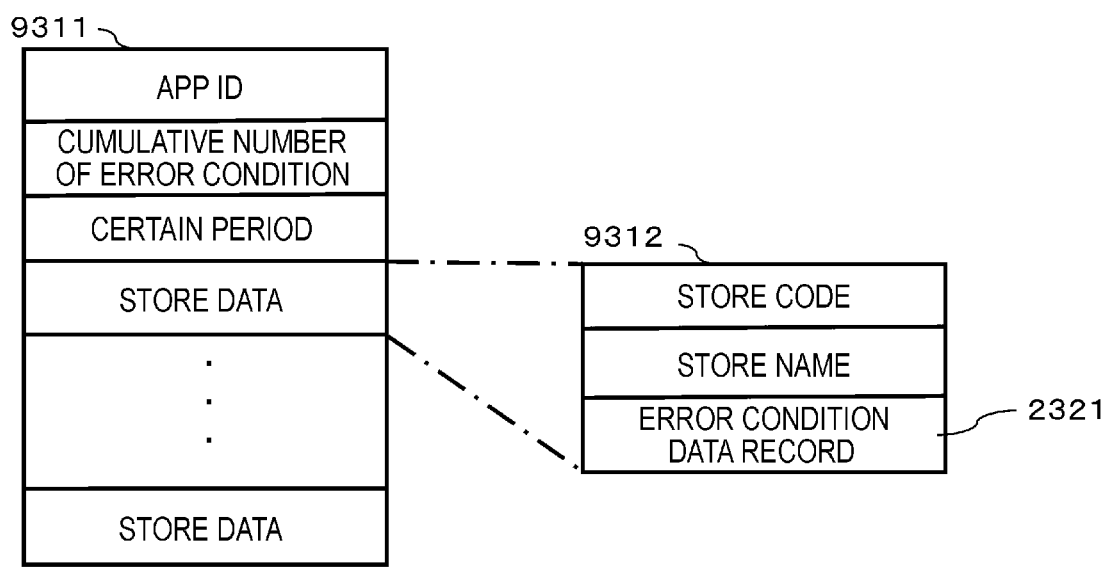
FIG. 24 is a schematic diagram illustrating an example of aggregate data records stored in an aggregate data file in the second embodiment.

FIG. 24 is a schematic diagram illustrating an example of an aggregate data record 9311 stored in the aggregate data file 931. As illustrated in FIG. 24, the aggregate data record 9311 stores the aggregate data generated for each app ID. The app ID is a unique code assigned to each shopping app in order to identify the shopping app executed when shopping at the store where the terminal management system SYB is installed. The aggregate data record 9311 includes items such as app ID, cumulative number of error conditions, certain period, and store data 9312. The cumulative number of error conditions is the total number of pieces of valid error condition data included in the error condition data record 2321 of each store data 9312. The certain period is set by, for example, an administrator who manages the terminal management system SYB. Here, the certain period is the same at each store where the terminal management system SYB is introduced. The store data 9312 includes store code, store name, the error condition data record 2321, and the like. There are as many pieces of store data 9312s as the shopping apps used at the store where the terminal management system SYB is introduced. The store code is a unique code assigned to each store to identify the store. The store name is the name of the store identified by the corresponding store code. The aggregate data record 9311 is not limited to the items in FIG. 24.

Figure 25:
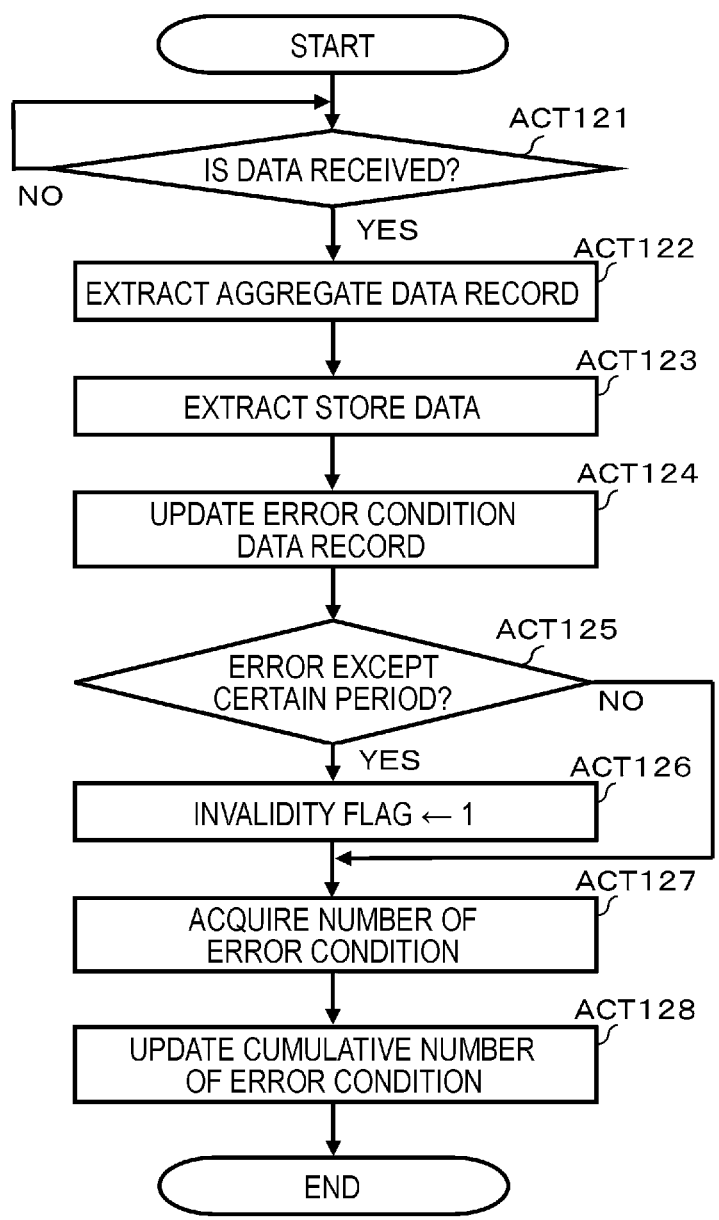
FIG. 25 is a flowchart illustrating a procedure for controlling a main part of a processor in the aggregation server in the second embodiment.
Figure 26:
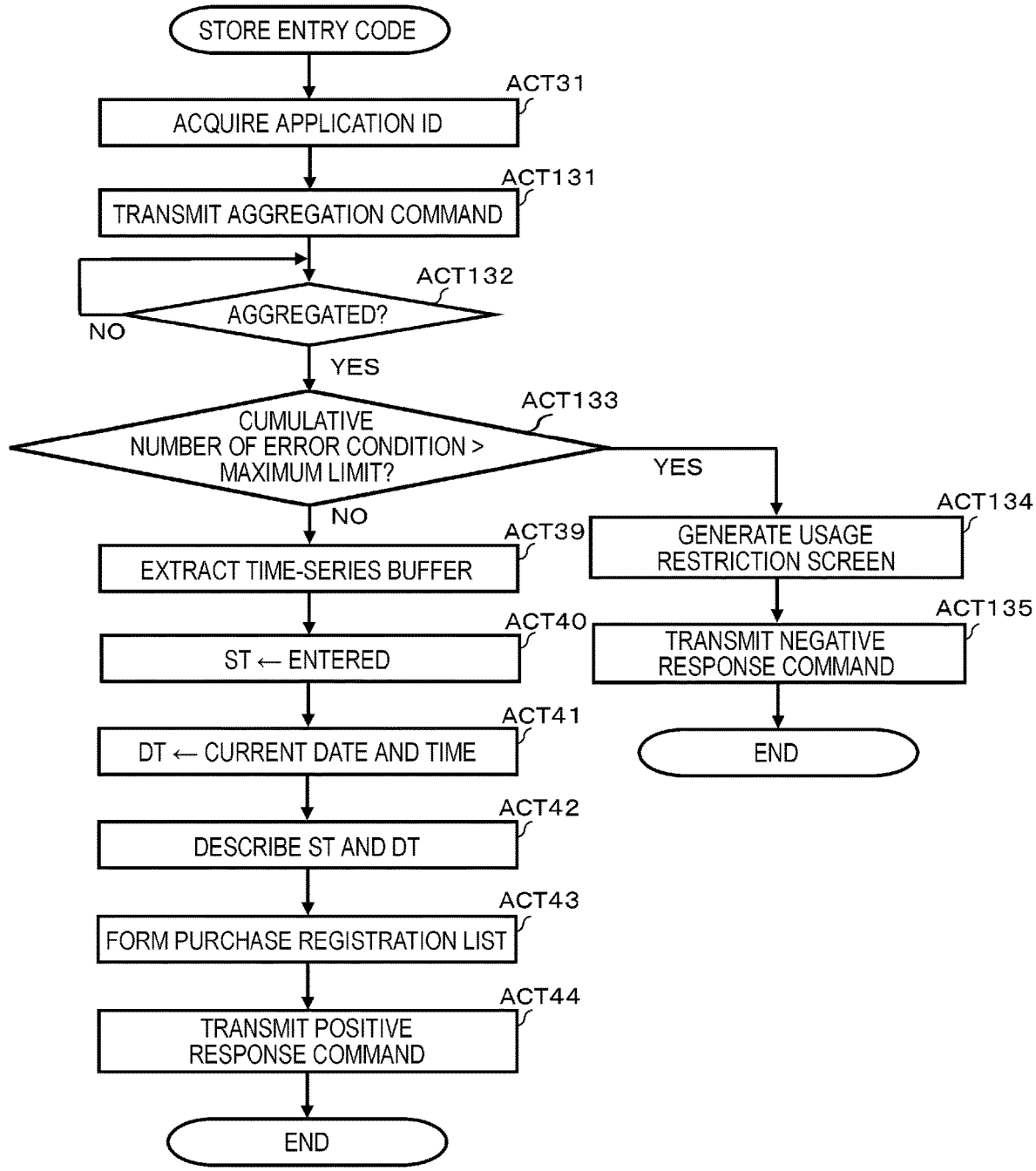
FIG. 26 is a flowchart illustrating a procedure for controlling a main part of a processor in a virtual POS server in the second embodiment.
Figure 27:
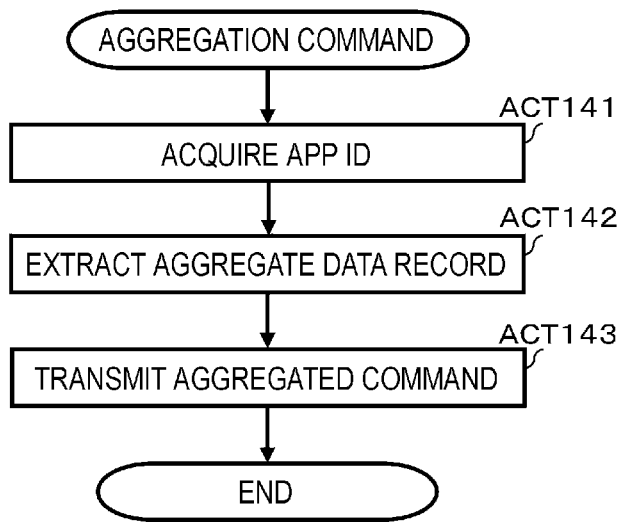
FIG. 27 is a flowchart illustrating a procedure for controlling the main part of the processor in the aggregation server in the second embodiment.

FIGS. 25 and 27 are flowcharts illustrating a procedure for controlling a main part executed by the processor 91 of the aggregation server 90 according to the control program in the second embodiment. FIG. 26 is a flowchart illustrating a procedure for controlling a main part executed by the processor 21 of the virtual POS server 20 according to the control program in the second embodiment. Then, FIG. 26 corresponds to FIG. 12 described in the first embodiment. Therefore, the same processing steps as those in the first embodiment are designated by the same reference numerals. The content of the operation described below is an example. As long as similar results can be obtained, the operation procedure and contents are not particularly limited.

In the second embodiment, for example, at a predetermined time after the store is closed every business day, the virtual POS server 20 transmits the store code and the error condition file 232 to the aggregation server 90. How to set the predetermined time is freely selected. The value of the predetermined time may be fixed in the virtual POS server 20, or may be changed to a desired value by the store that manages the virtual POS server 20. The store code is stored in, for example, the main memory 22 of the virtual POS server 20.

In the second embodiment, for example, at a predetermined time after the store is closed every business day until the store code and the error condition file 232 are received, the aggregation server 90 shall initialize the cumulative number of error conditions included in the aggregate data record 9311 stored in the aggregate data file 931. By the initialization, the cumulative number of error conditions is reset to "0". The predetermined time may be a fixed value in the aggregation server 90, or may be changed to a desired value by the administrator who manages the aggregation server 90.

The processor 91 of the aggregation server 90 waits to receive a store code and the error condition file 232 as ACT 121 in FIG. 25. If the store code and the error condition file 232 are received, the processor 91 determines YES in ACT 121 and proceeds to ACT 122.

The processor 91 extracts the aggregate data record 9311 including each app ID from the aggregate data file 931 for each app ID that identifies the error condition data record 2321 stored in the error condition file 232 received as ACT 122.

The processor 91 extracts the store data 9312 including the store code received as ACT 123 from the aggregate data record 9311.

The processor 91 updates the error condition data record 2321 included in the store data 9312 as ACT 124 to the received error condition data record 2321.

The processor 91 confirms whether the error condition data record 2321 updated by the processing of ACT 124 has an error raised date outside a certain period of time as ACT 125. The certain period is a certain period included in the aggregate data record 9311 extracted by the processing of ACT 122. If there is no error raised date outside the certain period, the processor 91 determines NO in ACT 125 and proceeds to ACT 127. The processing of ACT 127 will be described later.

If there is an error raised date outside the certain period, the processor 91 determines YES in ACT 125 and proceeds to ACT 126. The processor 91 sets the invalidity flag of the same line as the error raised date outside the certain period to "1" as ACT 126. That is, all items on the same line as the invalidity flag with "1" set are invalidated. If the error condition data record 2321 has a plurality of error raised dates outside the certain period, the invalidity flag on the same line as each error raised date is set to "1".

The processor 91 acquires the number of error conditions from the error condition data record 2321 as ACT 127. If there are a plurality of pieces of store data 9312, the number of error conditions is the total number obtained by acquiring the number of error conditions from the error condition data record 2321 included in each store data 9312.

The processor 91 updates the cumulative number of error conditions as ACT 128. Specifically, the processor 91 updates the cumulative number of error conditions included in the aggregate data record 9311 to the number of error conditions acquired in the processing of ACT 127. With the above, the processor 91 ends the information processing of the procedure illustrated in the flowchart of FIG. 25.

By the way, as in the first embodiment, in the second embodiment as well, if the processor 21 of the virtual POS server 20 receives a store entry command from the mobile terminal 60 via the communication interface 25, the command reception processing of the procedure illustrated in the flowchart of FIG. 26 is started.

In the second embodiment, the processing of ACT 131 to ACT 133 is performed after the processing of ACT 31.

The processor 21 controls the communication interface 25 as ACT 131 to send an aggregation command to the virtual POS server 20. Therefore, the aggregation command is transmitted via the communication interface 25. The aggregation command is received by the relay server 70 via the communication network 1 and transmitted to the aggregation server 90 via the communication network 2. The aggregation command includes the app ID acquired in the processing of ACT 31.

If the processor 91 of the aggregation server 90 receives an aggregation command from the virtual POS server 20 via the communication interface 95, the processor 91 starts the command reception processing of the procedure illustrated in the flowchart of FIG. 27.

The processor 91 acquires the app ID from the aggregation command as ACT 141. Then, the processor 91 extracts the aggregate data record 9311 identified by the app ID from the aggregate data file 931 as ACT 142.

The processor 91 controls the communication interface 95 to send an aggregated command to the virtual POS server 20 as ACT 143. Therefore, the aggregated command is transmitted via the communication interface 95. The aggregated command is received by the relay server 70 via the communication network and transmitted to the virtual POS server 20 via the communication network 1. The aggregated command includes the aggregate data record 9311 identified by the app ID obtained in the processing of ACT 141.

Returning to the description of FIG. 26, the processor 21 of the virtual POS server 20 that controls the transmission of the aggregation command in ACT 131 waits for an aggregated command from the aggregation server 90 as ACT 132. If the aggregated command is received from the aggregation server 90, the processor 21 determines YES in ACT 132 and proceeds to ACT 133.

The processor 21 confirms whether the cumulative number of error conditions included in the aggregate data record 9311 exceeds the maximum limit in the aggregate data record 9311 included in the aggregated command by the function of the restriction unit 213 as ACT 133.

If the cumulative number of error conditions does not exceed the maximum limit, the processor determines NO in ACT 133 and proceeds to ACT 39. The processing of ACT 39 to ACT 44 is the same as that of the first embodiment. With the above, the processor 21 ends the processing of receiving the store entry command.

In the second embodiment, if the maximum limit is exceeded, the processor 21 determines YES in ACT 133 and proceeds to ACT 134.

The processor 21 generates the usage restriction screen 100 and a second error condition list screen based on the aggregate data record 9311 as ACT 134. The second error condition list screen will be described later.

The processor 21 controls the communication interface 25 as ACT 135 to send a negative response command to the mobile terminal 60 by the function of the output unit 214. Therefore, the negative response command is transmitted via the communication interface 25. The negative response command is wirelessly transmitted from the access point 50 via the communication network 1 and received by the mobile terminal 60 that is the source of the store entry command. The negative response command includes the image data of the usage restriction screen 100 and the image data of the second error condition list screen. With the above, the processor 21 ends the processing of receiving the store entry command.

If a negative response command is received from the virtual POS server 20, the processor 61 controls the touch panel 64 so that the usage restriction screen 100 is displayed. The user who wants to view the details of the error condition touches the "details" button 102. If the "details" button 102 is touched, a second error condition list screen 300 (see FIG. 28) is displayed.

Figure 28:
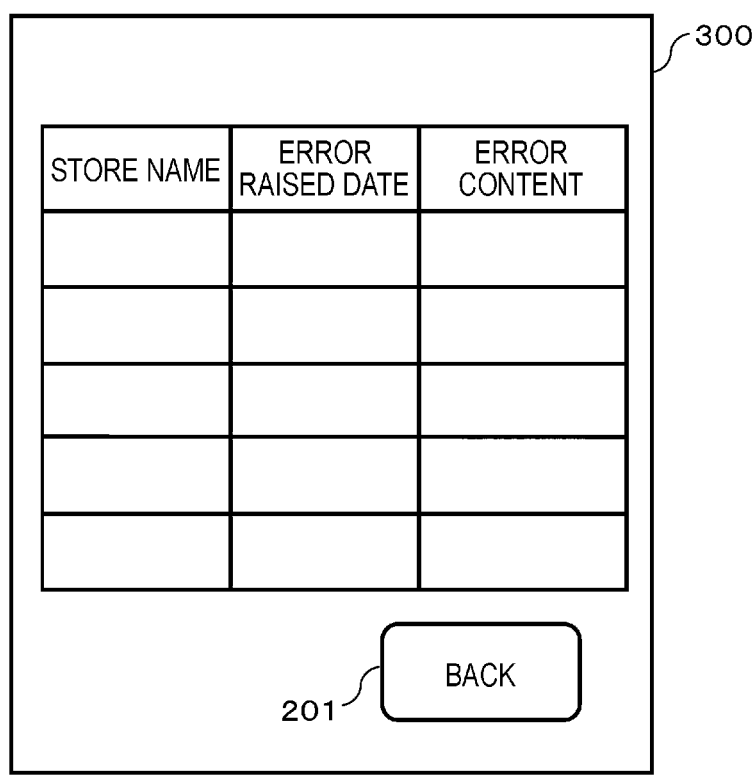
FIG. 28 is a diagram illustrating an example of a second error condition list screen in the second embodiment.

FIG. 28 is a diagram illustrating an example of the second error condition list screen 300. As can be seen by comparing FIGS. 21 and 28, in the second embodiment, store name is further displayed. The text data and image contents displayed in FIG. 28 are examples.

Therefore, in such the terminal management system SYB, if a store entry command is sent from the mobile terminal 60 to the virtual POS server 20, the virtual POS server 20 sends an aggregation command including the app ID included in the store entry command to the aggregation server 90. The aggregation server 90 sends an aggregated command including the aggregate data record 9311 identified by the app ID to the virtual POS server 20. If the aggregated command is received by the virtual POS server 20, the cumulative number of error conditions that raised during the certain period included in the aggregate data record 9311 is acquired. If the cumulative number of error conditions exceeds the maximum limit, a negative response command including the image data of the usage restriction screen 100 and the image data of the second error condition list screen 300 is transmitted to the mobile terminal 60.

Therefore, it is possible to restrict the purchase processing (transaction) by the mobile terminal 60 for the user who operates the mobile terminal 60 in which an error condition raised in a plurality of stores.

If a negative response command is received by the mobile terminal 60, the usage restriction screen 100 is displayed on the touch panel 64. If the "details" button 102 of the usage restriction screen 100 is touched, the second error condition list screen 300 in which the store name is further displayed is displayed. Therefore, the user can confirm the details of the error conditions that are raised in the plurality of stores.

Although the first embodiment and the second embodiment are described above, the embodiment is not limited thereto.

In the above embodiments, it is illustrated that the data code for entering the store and the data code for exiting the store are coded by a predetermined two-dimensional code system. For example, the data code for entering the store and the data code for exiting the store may be a one-dimensional code system depending on the amount of information included in a medium.

In the above embodiment, it is illustrated that if the user reads the data code for entering the store prepared at the entrance of the store with the camera 65, the status ST is set to "entered", assuming that an operation of entering the store was performed. It is illustrated that if the user reads the data code for exiting the store prepared at the exit of the store with the camera 65, the status ST is set to "exited", assuming that an operation of exiting the store was performed. Even when entering or exiting the store without reading the data code for entering the store or the data code for exiting the store, the status ST may be set to "entered" or "exited". For example, there is a gate device at the entrance and exit of the store. The gate device includes a pass sensor that detects that a customer passed through the gate device and a reader that reads the terminal code of the mobile terminal 60. For example, a customer passes through the gate device in the direction of entering the store. If the terminal code of the mobile terminal 60 owned by the customer is read by the reader, the status ST may be set to "entered", assuming that an operation of entering the store was performed. For example, the customer passes through the gate device in the direction of exiting the store. If the terminal code of the mobile terminal 60 owned by the customer is read by the reader, the status ST may be set to "exited", assuming that an operation of exiting the store was performed.

In the above embodiment, it is illustrated that the status ST is set to "registered" in the case of the first purchased commodity. For example, if the purchased commodities registered by the user are deleted one by one or collectively deleted (transaction canceled) and the purchased commodity data 2211 in the purchase registration list 221 no longer exists, the status ST may be set to "entered". Here, the status ST is described in the time-series buffer 231 in the order of "entered", "registered", and "entered".

In the above embodiment, it is illustrated that the checkout incomplete screen is displayed on the touch panel 64 of the mobile terminal 60. For example, a voice message indicating that the transaction is not made may be output.

In the above embodiments, it is illustrated that the connection management server 30 is connected to the communication network 1. For example, the connection management server 30 may be provided on the Internet as cloud computing.

In the above embodiments, it is illustrated that the virtual POS server 20 uses a part of the storage area of the auxiliary storage device 23 as the area of the time-series buffer 231. For example, the time-series buffer 231 may be stored in the external memory 63 of the mobile terminal 60.

In the above embodiments, the virtual POS server 20 was described as one aspect of the terminal management device. For example, the virtual POS server 20 further having a function as at least one of the store server 10, the connection management server 30, and the aggregation server 90 may be used as the terminal management device. In other words, the store server 10, the connection management server 30, or the aggregation server 90 having the function as the virtual POS server 20 may be used as the terminal management device.

In the second embodiment, it is illustrated that the virtual POS server 20 transmits the store code and the error condition file 232 to the aggregation server 90 at a predetermined time after the store is closed every business day. The timing of sending to the aggregation server 90 may be, for example, a predetermined time before the opening of the store every business day. Here, for example, at a predetermined time from a predetermined time before the store opens every business day until the store code and the error condition file 232 are received, the aggregation server 90 may initialize the cumulative number of error conditions included in the aggregate data record 9311 stored in the aggregate data file 931.

While certain embodiments have been described, the embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A terminal management device comprising:
at least one processor configured to:
acquire status information indicating an operating condition of a mobile terminal operated by a customer, the mobile terminal configured to perform purchase processing of a commodity;
detect an error condition of the mobile terminal based on the status information acquired; and
restrict purchase processing by the mobile terminal according to a number of detected error conditions of the mobile terminal.

2. The device according to claim 1, wherein:
the at least one processor is further configured to output a message to the mobile terminal when the purchase processing by the mobile terminal is restricted.

3. The device according to claim 2, wherein
the at least one processor is further configured to output to the mobile terminal a list of detected error conditions of the mobile terminal.

4. The device according to claim 1, wherein the at least one processor includes a central processing unit.

5. The device according to claim 1, wherein the terminal management device includes a point of sale server.

6. The device according to claim 1, wherein the status information includes at least one of entered, registered, checkout in progress, checkout completed, or exited.

7. The device according to claim 1, wherein the mobile terminal includes at least one of a smart phone or a tablet terminal.

8. The device according to claim 1, wherein an error content of the error condition includes at least one of checkout incomplete, or disconnected with checkout incomplete.

9. The device according to claim 1, wherein the error condition includes an invalidity flag corresponding to an error.

10. The device according to claim 1, wherein the number of error conditions includes a threshold value.

11. The device according to claim 1, wherein the at least one processor is configured to cause a restriction screen to display the number of error conditions.

12. A terminal management system comprising:
a plurality of terminal management devices that each includes at least one processor configured to:
acquire status information indicating an operating condition of a mobile terminal operated by a customer, the mobile terminal configured to perform purchase processing of a commodity, and
detect an error condition of the mobile terminal based on the status information acquired; and
a storage configured to collect and store information related to the detected error condition of the mobile terminal, wherein
the at least one processor is configured to restrict purchase processing by the mobile terminal according to the number of error conditions of the mobile terminal based on the information related to the error condition of the mobile terminal stored in the storage.

13. A terminal management method executed by a computer of a terminal management device, the method comprising:
acquiring status information indicating an operating condition of a mobile terminal operated by a customer, the mobile terminal configured to purchase processing of a commodity;
detecting an error condition of the mobile terminal based on the status information acquired by the acquiring; and
restricting purchase processing by the mobile terminal according to the number of error conditions of the mobile terminal detected by the detecting.

14. The method according to claim 13, further comprising outputting a message to the mobile terminal when the purchase processing by the mobile terminal is restricted.

15. The method according to claim 14, further comprising outputting to the mobile terminal a list of detected error conditions of the mobile terminal.

* * * * *